US007565353B2

(12) United States Patent
Gatto et al.

(10) Patent No.: US 7,565,353 B2
(45) Date of Patent: Jul. 21, 2009

(54) TRUSTED TRANSACTIONAL INTERNET KIOSK

(75) Inventors: Jean-Marie Gatto, London (GB); Thierry Brunet de Courssou, Palo Alto, CA (US); Pierre-Jean Beney, London (GB)

(73) Assignee: Mudalla Technology, Inc., Henderson, NV (US)

( * ) Notice: Subject to any disclaimer, the term of this patent is extended or adjusted under 35 U.S.C. 154(b) by 1745 days.

(21) Appl. No.: 09/862,036

(22) Filed: May 21, 2001

(65) Prior Publication Data
US 2004/0254954 A1    Dec. 16, 2004

(51) Int. Cl.
G06F 17/30      (2006.01)
G06F 15/16      (2006.01)
G06Q 30/00      (2006.01)

(52) U.S. Cl. .............................. 707/10; 707/1; 707/201; 709/217; 705/26; 902/30

(58) Field of Classification Search .................... 707/10, 707/100–104.1, 200–204, 1–5; 705/1–3, 705/14, 26–27, 401, 41–43, 10; 725/24, 725/109; 709/203–215, 216–219, 220–225; 700/231–237; 235/379–382, 472.02; 377/116; 713/200–202, 193; 194/217, 347; 902/10, 902/22, 30
See application file for complete search history.

(56) References Cited

U.S. PATENT DOCUMENTS

| | | | | |
|---|---|---|---|---|
| 5,761,071 | A | * 6/1998 | Bernstein et al. | ............ 700/237 |
| 5,781,909 | A | * 7/1998 | Logan et al. | ................ 707/200 |
| 5,812,765 | A | * 9/1998 | Curtis | ........................ 709/200 |
| 5,905,521 | A | 5/1999 | Gatto | |
| 5,949,411 | A | * 9/1999 | Doerr et al. | .................. 715/716 |
| 5,960,411 | A | 9/1999 | Hartman | |
| 5,970,150 | A | * 10/1999 | Sansone | ...................... 380/51 |
| 6,078,848 | A | * 6/2000 | Bernstein et al. | ............ 700/237 |

(Continued)

FOREIGN PATENT DOCUMENTS

EP            1132877 A2 *  9/2001    ..................... 17/26

(Continued)

OTHER PUBLICATIONS

U.S. Appl. No. 60/290,563, filed May 11, 2001.*

(Continued)

Primary Examiner—Srirama Channavajjala
(74) Attorney, Agent, or Firm—Young Law Firm, P.C.

(57) ABSTRACT

A public access kiosk for conducting trusted lightweight e-commerce transactions. A trusted transactional cache and the associated transactional protocol allow e-commerce transactions to be committed to a remote server extremely quickly and with little network overhead. The end-to-end transactions are completed is just a few seconds allowing users to carry out e-commerce transactions without having to stand in front of the a display for minutes as is usually the case when making purchases on the Internet. The invention operates equally well on robust private networks as on unpredictable Internet or wireless networks, avoiding upsetting shoppers who would otherwise have to wait for the transaction to complete in the case of a temporary communication failure with the remote server or other failure. The methods and devices described herein may advantageously be used to offer large scale and cost-effective micro-payments solutions.

30 Claims, 16 Drawing Sheets

U.S. PATENT DOCUMENTS

| | | | |
|---|---|---|---|
| 6,085,195 A * | 7/2000 | Hoyt et al. ............... | 707/10 |
| 6,118,860 A | 9/2000 | Hillson | |
| 6,195,694 B1 * | 2/2001 | Chen et al. ............. | 709/220 |
| 6,233,565 B1 | 5/2001 | Lewis | |
| 6,243,687 B1 * | 6/2001 | Powell ................... | 705/14 |
| 6,286,029 B1 * | 9/2001 | Delph ..................... | 709/203 |
| 6,318,536 B1 * | 11/2001 | Korman et al. ......... | 194/217 |
| 6,324,528 B1 * | 11/2001 | Hillson et al. .......... | 705/400 |
| 6,334,110 B1 | 12/2001 | Walter et al. | |
| 6,381,744 B2 * | 4/2002 | Nanos et al. ........... | 725/24 |
| 6,385,592 B1 | 5/2002 | Angles et al. | |
| 6,389,401 B1 | 5/2002 | Kepecs | |
| 6,408,278 B1 * | 6/2002 | Carney et al. .......... | 705/14 |
| 6,519,596 B1 * | 2/2003 | Hoyt et al. .............. | 707/10 |
| 6,549,890 B2 * | 4/2003 | Mundell et al. ........ | 705/10 |
| 6,792,401 B1 * | 9/2004 | Nigro et al. ............. | 703/6 |
| 6,837,436 B2 * | 1/2005 | Swartz et al. .......... | 235/472.02 |
| 6,970,845 B1 * | 11/2005 | Drummond et al. ..... | 705/43 |
| 2001/0011250 A1 * | 8/2001 | Paltenghe et al. ...... | 705/41 |
| 2001/0011680 A1 * | 8/2001 | Soltesz et al. .......... | 235/379 |
| 2001/0029583 A1 * | 10/2001 | Palatov et al. .......... | 713/193 |
| 2001/0034607 A1 * | 10/2001 | Perschbacher et al. .... | 705/1 |
| 2002/0026396 A1 * | 2/2002 | Dent et al. .............. | 705/35 |
| 2002/0032582 A1 * | 3/2002 | Feeney et al. .......... | 705/2 |
| 2002/0035697 A1 * | 3/2002 | McCurdy et al. ....... | 713/200 |
| 2002/0046195 A1 * | 4/2002 | Martin et al. ........... | 705/401 |
| 2002/0077978 A1 * | 6/2002 | O'Leary et al. ......... | 705/40 |
| 2002/0156645 A1 * | 10/2002 | Hansen ................... | 705/1 |
| 2002/0169790 A1 * | 11/2002 | Lee ......................... | 707/104.1 |
| 2002/0174160 A1 * | 11/2002 | Gatto et al. ............. | 709/1 |
| 2002/0174444 A1 * | 11/2002 | Gatto et al. ............. | 725/133 |
| 2003/0132298 A1 * | 7/2003 | Swartz et al. .......... | 235/472.02 |
| 2004/0098740 A1 * | 5/2004 | Maritzen et al. ....... | 725/27 |
| 2004/0124243 A1 * | 7/2004 | Gatto et al. ............. | 235/487 |
| 2004/0181531 A1 * | 9/2004 | Becker .................... | 707/9 |

FOREIGN PATENT DOCUMENTS

| | | | | |
|---|---|---|---|---|
| GB | 2256952 A | * | 12/1992 | ............ 11/14 |
| WO | WO 00/72160 A1 | * | 11/2000 | |
| WO | WO 01/35359 | * | 5/2001 | |
| WO | WO 03/102840 A1 | * | 12/2003 | ............ 17/60 |

OTHER PUBLICATIONS

Self-service Kiosk News, Elo TouchSystems Announces production of iMac Indigo 400 MHz with iTouch "Touch-on-Tube" technology, Kiosks.org, Internet Kiosks-resources from Wincor, DFI-USA and many more internet kiosk companies, 3 pages.*

Kiosk News: "TouchSystems adds rack mount system to all-in-one touch PC line", targeted to industrial and manufacturing automation, process control, Kiosks.org 3 pages.*

Alessandro Andreadis et al. "Universal access to personalised information services", paper presented at the IST Mobile summi Oct. 2001, 6 pages.*

Wieland Holfelder et al. "a netwokred multimedia retrieval management system for distributed Kiosk applications", 1994 international conference on multimedia computing and systems, IEEE computer society press, May 1994, pp. 1-10.*

U.S. Appl. No. 60/250,495.*

U.S. Appl. No. 60/213,423.*

Yeung,C et al. "a multi-agent based tourism Kiosk on internet", proceedings of the thirty first conference on system sciences, Jan. 1998, vol. 4, pp. 452-461.*

Your Home Expert—Honeywell's Webpad, *New Version Honeywell WebPAD II Internet Appliance*, pp. 1, World Wide Web, http://content.honeywell.com/Home/webpad/webpad.htm (Printed on May 2, 2001).

Silicon Image, *Silicon Image All Digital—No Limits, Products, Features Overview*, pp. 1-2, World Wide Web, http://siimage.com/products/overview_sii861.asp.

Schneier, Bruce, *Secrets and Lies: Digital Security In A Networked World*, Ch. 6, pp. 85-101, John Wiley & Sons, Inc., 2000.

Schneier, Bruce, *Secrets and Lies, Digital Security In A Networked World*, Ch. 7, pp. 102-119, John Wiley & Sons, Inc., 2000.

Schneier, Bruce, *Secrets and Lies, Digital Security In A Networked World*, Ch. 20, pp. 307-317, John Wiley & Sons, Inc., 2000.

Intel (R) Security Program: Intel (R) Random Number Generator (RNG), *Intel Random Number Generator: Hardware Support That Helps Improve A Range Of Security Technologies*, p. 1, wysiwyg://2/http://developer.intel.com/design/security/mg/mg.htm.

Microsoft Passport: A Single Name, Password and Wallet For The Web! *Microsoft Passport: One Name, One Password*, pp. 1-2, http://www.passport.com/Consumer/Default.asp?Pplcid=1033 (As printed Mar. 19, 2001).

Simtek Corporation, *Simtek: Memory Like A Steel Trap—World's Fastest Reprogrammable Nonvolatile Memories*, p. 1, http://www.simtek.com/.

Simtek, *nvSRAM Basics*, pp. 8-1 through 8-6.

* cited by examiner

TRUSTED TRANSACTIONAL INTERNET KIOSK

CROSS-REFERENCE TO RELATED APPLICATIONS

This application is related to co-pending and commonly assigned application Ser. No. 09/861,850 filed on May 21, 2001, entitled "Trusted Transactional Controller" and co-pending and commonly assigned application Ser. No. 09/862,165 filed on May 21, 2001, entitled "Trusted Transactional Set-Top Box", the disclosures of each being incorporated herein by reference.

BACKGROUND OF THE INVENTION

1. Field of the Invention

The invention generally pertains to the field of electronic commerce and the merging of technology and personal services.

2. Description of the Related Art

E-commerce is traditionally practiced using a personal computer (PC) connected to the Internet and a web browser. Although goods and services providers can offer attractive, practical, efficient and reliable e-commerce via the Internet, a typical end-to-end e-commerce transaction can take several minutes to complete. As there are no dedicated peripherals to speed up the entry of user credentials (which include personal and financial information) and the item chosen, all these details must be entered via the keyboard and mouse.

E-commerce via Internet terminals installed in commercial areas (shopping malls, public areas and the like) is even more laborious, as shoppers (who may not be computer literate) must to slowly enter all of the alpha-numerical information needed to initiate and complete the intended transaction using a keyboard.

Moreover, existing e-commerce methods can leave the consumer wondering whether the online transaction was successfully completed. Sometimes, the user is not sure that the initiated transaction was, in fact, successful until the goods actually show up at the door. A good practice is for the e-commerce provider to send an acknowledgment by sending an email to the user, the email detailing all of the details of the transaction, thereby allowing the user to check on the status of the order. First rate e-commerce sites such as Amazon.com have refined the process in order to provide an excellent quality of service that almost everyone has come appreciate and trust. For example, the "1-click" purchase model patented by Amazon.com considerably speeds up the purchase of items for already registered users, and the user need not wait online for a confirmation that the credit card payment was accepted. Easy account access allows the user to check the status of his or her order and the delivery status thereof. Every change either made by the user or by the provider is automatically acknowledged in an email message posted to the user.

Interestingly, the Amazon.com website, probably the most recognized B2C (business-to-consumer) model is not directly applicable to Internet information kiosks, and as of the date of this filing, there is no well suited model successfully in operation.

Removing the issue of bad or non-payment, such a transactional model for executing an online transaction is essentially biased in favor of the provider, in that the provider always knows whether the purchase request is valid or is invalid. In contrast, the shopper may have doubts as to the success of his or her purchase request until such time as an explicit acknowledgment is provided, which may not occur until a quite a significant time after the online order has been submitted (which is wholly unsuited to the manner in which public-access Internet terminals are used). Typically, the acknowledgment is supplied as a displayed message, a printed receipt or an email. This is because e-commerce servers are not optimized to provide an instantaneous (or near instantaneous) acknowledgment, especially when a clearing bank is involved in validating a credit card purchase.

Consequently, because of this lack of a successful e-commerce transactional model, public access Internet kiosks used to conduct e-commerce are currently unknown.

SUMMARY OF THE INVENTION

An object of the present invention, therefore, is to offer a method for conducting trusted lightweight e-commerce transactions via public access kiosks, whereby the e-commerce transaction is performed in seconds and whereby the user need not be concerned by the possible failure of the transaction commit to the remote server. It is another object of the present invention to provide an e-commerce model ideally suited for frequent and quick micro-payments.

In accordance with the above-described objects and those that will be mentioned and will become apparent below an electronic kiosk, according to an embodiment of the present invention, comprises a processor for controlling the kiosk; a network interface to interface with a computer network; a user interface enabling user interaction with the processor and initiation of a transaction with a remote server coupled to the computer network, and a non-volatile cache memory controlled by the processor and configured to selectively store a context of the transaction to enable a recovery of the transaction after an interruption thereof.

The non-volatile cache memory may be solid-state, and may include a Non-Volatile Random Access Memory (NVRAM), for example. The non-volatile cache memory may include a context data save engine for selectively storing the context of the transaction to the NVRAM and a context data recovery engine for retrieving the stored context from the NVRAM and recovering the transaction to enable a successful completion of the transaction. The context data save engine may be configured to store the context of the transaction before sending the transaction to the remote server; after sending the transaction to the remote server but before having received an acknowledgment of the transaction from the remote server, and/or after having received a confirmed acknowledgment of the transaction from the remote server, for example. The kiosk may further include a printer controlled by the processor, the printer being configured to print human-readable information and/or machine-readable information. The printer may be configured to print an acknowledgment of the transaction.

The kiosk may include a reader controlled by the processor, the reader being configured to scan and decode printed machine-readable information and/or human readable information. The machine-readable information may include a barcode and the reader may include a barcode reader.

The processor may be configured to execute the transaction in a first user session that concludes after the context data save engine has saved the context of the transaction to the NVRAM and a provisional acknowledgment is provided to the user and to execute a second remote server session that concludes after a confirmed acknowledgement is received from the remote server and provided to the user. The user session may be shorter in duration than the remote server session. The kiosk may include a magnetic, a smart card reader and/or other means of acquiring the user's credentials. The user interface may include a display and/or a touch screen.

The processor may be programmed to cause the kiosk to 1) enter a user session that exposes the user to messages and accepts user input to initiate the transaction via the user interface, commit the transaction to the non-volatile cache and provide the user with a provisional acknowledgment, and 2) enter a remote server session that commits the transaction to the remote server via the computer network by sending a single data packet that encapsulates all information necessary to initiate the transaction and to repeatedly re-send the single data packet until a valid acknowledgment may be received from the remote server. The processor may be further programmed to ignore any duplicate data packet that may be received form the remote server. The kiosk may be configured for public access.

The present invention is also a method of carrying out an online transaction between an electronic kiosk and a remote server, each of the kiosk and the remote server being coupled to a network. According to an embodiment thereof, the present method comprises the steps of initiating a transaction at the kiosk; storing a copy of the transaction in a non-volatile memory within the kiosk; sending the transaction to the remote server under a control of the kiosk, and receiving a confirmed acknowledgment of the transaction from the remote server and providing the confirmed acknowledgment or generating a provisional acknowledgment of the transaction from the copy of the transaction stored in the non-volatile memory if the confirmed acknowledgment may be not received within a predetermined period of time.

The method may also include the steps of receiving the confirmed acknowledgment from the remote server after the predetermined period of time and storing the received confirmed acknowledgment in the non-volatile memory. A step of providing the stored confirmed acknowledgment upon request may also be carried out. A step of re-sending the copy of the user transaction stored in the non-volatile memory to the remote server may also be carried out upon failure to receive the confirmed acknowledgment from the remote server. The re-sending step may be carried out until a confirmed acknowledgment of the transaction is received from the remote server. Alternatively, the re-sending step may be carried out a predetermined number of times. The generating step may include a step of printing the provisional acknowledgment together with corresponding machine-readable information that uniquely identifies the transaction. The generating step may include a step of printing the provisional acknowledgment together with machine-readable information uniquely identifying the transaction and the method further may include a step of the kiosk reading the machine-readable information and providing the stored confirmed acknowledgment that corresponds to the read machine-readable information. The stored confirmation acknowledgment providing step may include a step of printing the confirmation acknowledgment.

The kiosk may include a user interface that enables user interaction with the kiosk and the initiating step may include a step of providing user credentials and selecting goods and/or services for purchase via the user interface. The user credentials may include identification and payment instrument information. The initiating step may include a step of encapsulating all information required for the remote server to process the transaction into a single data packet and the storing and sending steps store and send the single data packet in the non-volatile memory and to the remote server, respectively. The information required for the remote server to process the transaction may include user credentials including an identity of the user; payment instrument information; delivery information, and/or information identifying the subject matter of the transaction, for example. The single data packet may be encrypted prior to the sending step.

BRIEF DESCRIPTION OF THE DRAWINGS

For a further understanding of the objects and advantages of the present invention, reference should be had to the following detailed description, taken in conjunction with the accompanying figures, in which like elements are referenced with like numerals and wherein.

DESCRIPTION OF THE PREFERRED EMBODIMENTS

As the term is used herein, "kiosk" refers to any apparatus at which users may obtain information and inquire about and/or purchase merchandise and/or services. Such a kiosk may also deliver entertainment in the form of movies, videos, promotions and lottery draws, to enumerate a few possibilities. A kiosk, according to the present invention, may be a freestanding apparatus, or may be integrated into some larger structure (such as a booth) or building. The kiosk may be configured for public access or for limited private access.

Such kiosks installed in shopping areas may be advantageously used as promotional vehicles for products and/or services. Effective promotional campaigns may be carried out by offering small incentives such as redemption coupons, rebate coupons or even quick games. Moreover, deployment of a very large number of such kiosks, on the order of 50,000 units for a single retail chain for example, must not bring the e-commerce remote servers (of online vendors) to which the kiosk is coupled to a crawl, even if all of the kiosks are operated simultaneously. Indeed, the appearance, operation, trustworthiness and convenience of the present kiosks must be such that shoppers are encouraged to frequently return to the store or locale in which the kiosk is deployed, thereby increasing the potential sales revenue thereof. It is anticipated that such kiosks could easily attract 3,000 shoppers per day and per unit over a period of 12 hours, with peak load peaks easily reaching 1,000 transactions per second at the remote server(s) to which the present kiosks are coupled.

Figure 1:
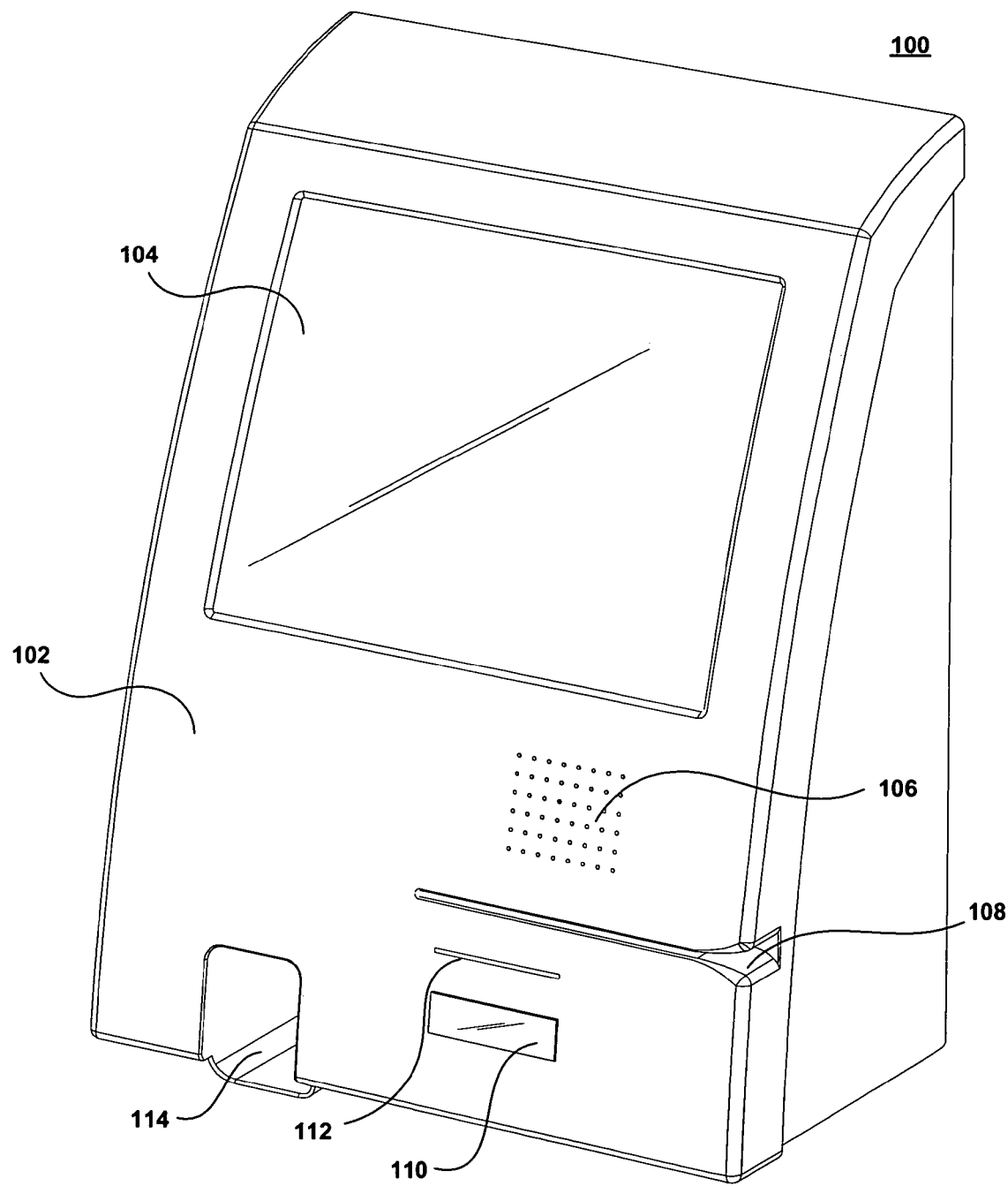
FIG. 1 shows an Internet transactional kiosk according to an embodiment of the present invention.

FIG. 1 shows an Internet transactional kiosk 100 according to an embodiment of the present invention. The transactional Internet kiosk 100 as seen on the outside by a public user may include an enclosure 102, a data display 104 (which may include a touch screen), a magnetic card reader 108, a smart card reader 112, a printed ticket exit 114, an optical reader 110 and/or a speaker 106, for example. The optical reader 110 may include a barcode reader or most any machine vision system.

Figure 2:
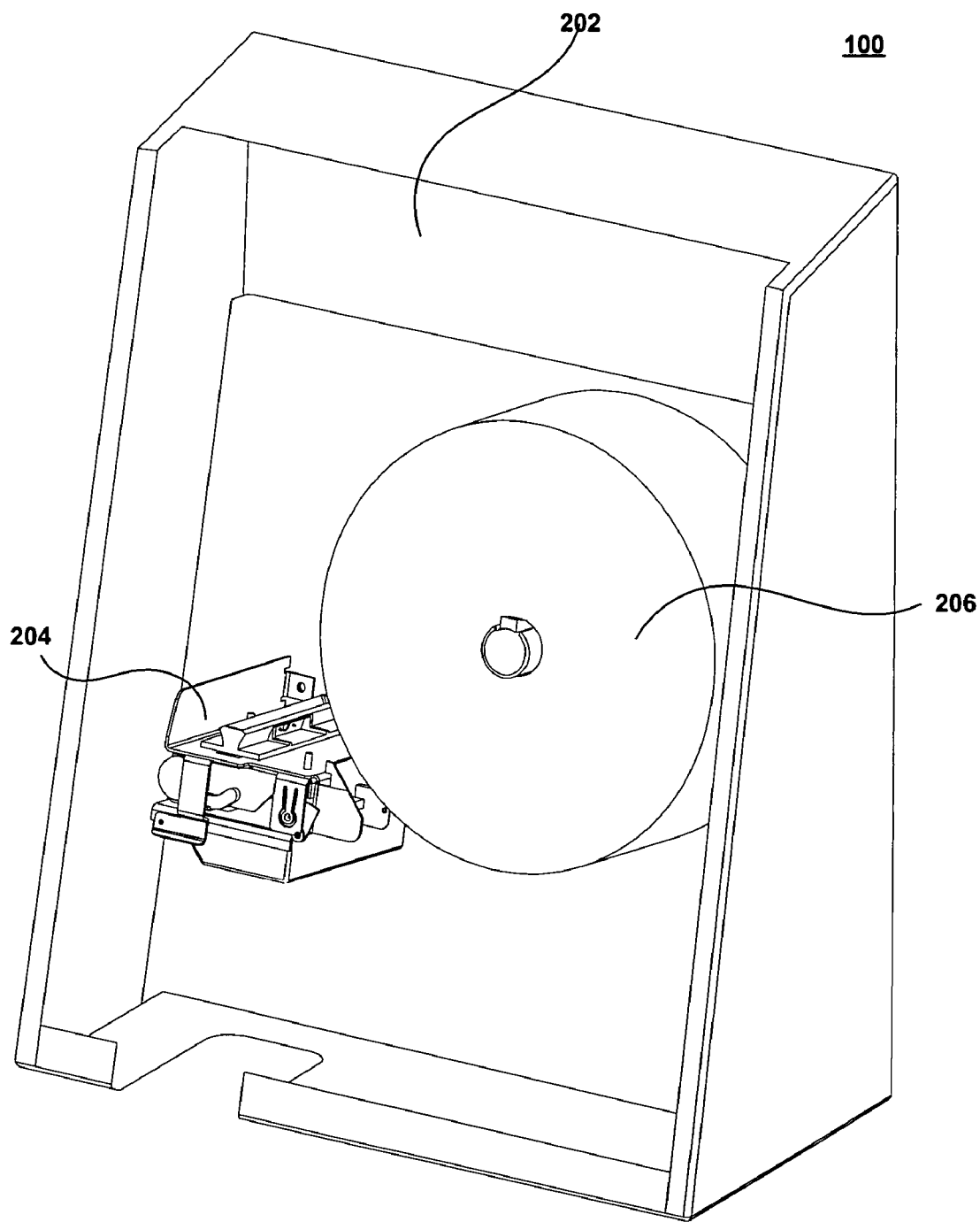
FIG. 2 shows the Internet transactional kiosk of FIG. 1, with the front cover thereof removed.

FIG. 2 shows the Internet transactional kiosk 100 of FIG. 1 with the front cover thereof removed. As shown therein, the present transactional Internet kiosk 100 may include a computer controller board (disposed behind protective panel 202), a ticket printer 204 and a large spool 206 of ticket (receipt) paper. The design of such a printer 204 (and that of the reader 110 discussed above) may draw, for example, from aspects of the printers and scanners disclosed in commonly assigned and co-pending U.S. patent applications Ser. No. 09/441,040 filed on Nov. 16, 1999 entitled "Compact Configurable Scanning Terminal" and/or Ser. No. 09/782,839 filed on Feb. 14, 2001 and entitled "Compact Document Scanner with Branding", the disclosure of each which is incorporated herein in its entirety.

Figure 3:
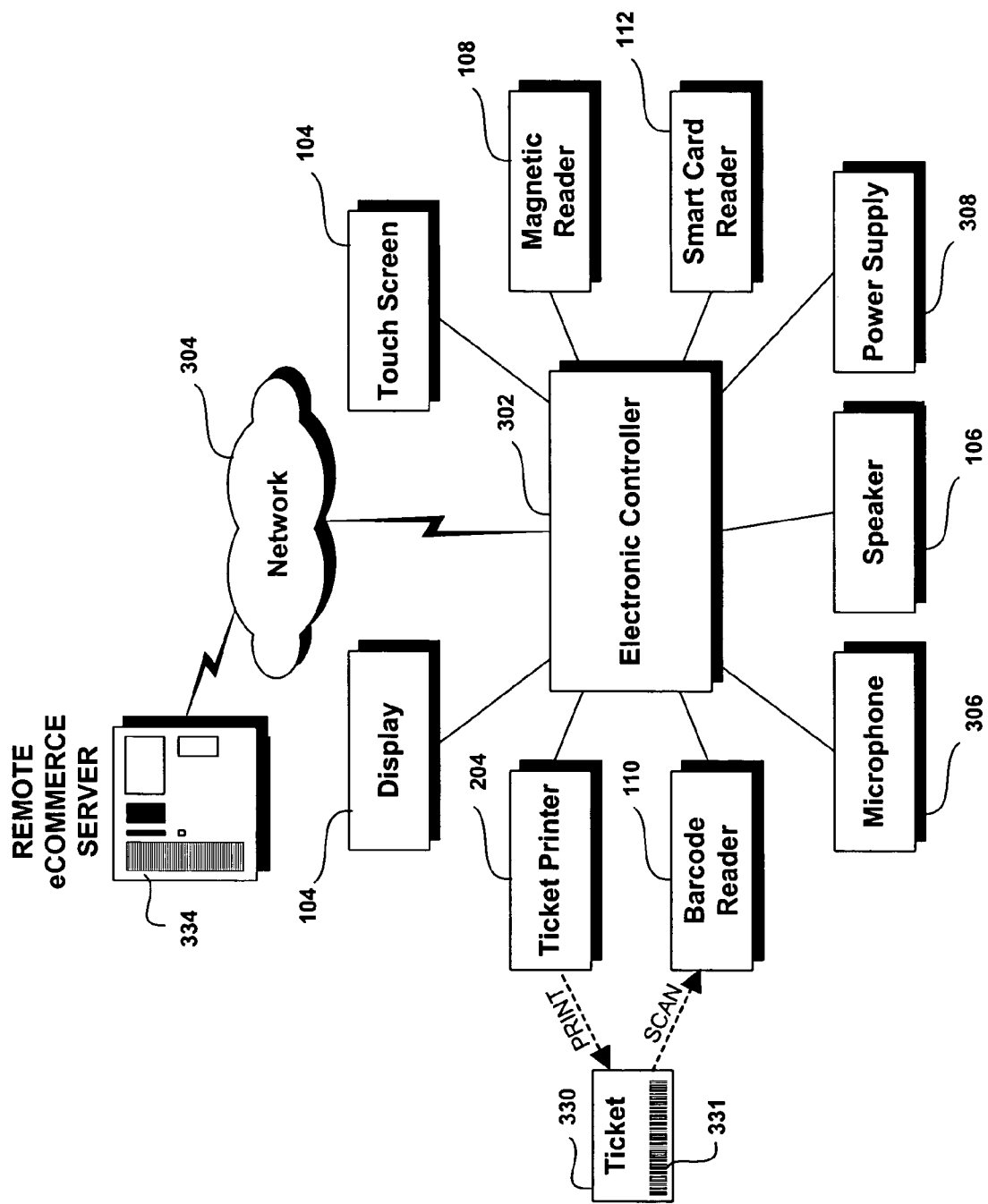
FIG. 3 is a block diagram illustrating the top-level architecture of an Internet Transactional kiosk, according to an embodiment of the present invention.

FIG. 3 is a block diagram illustrating the top-level architecture of an Internet transactional kiosk 100 according to an embodiment of the present invention. As shown, the top-level system architecture of the present transactional Internet kiosk 100 may include a computer controlled electronic controller 302 to which a number of elements may be coupled. These elements may include a display 104, a touch screen (may be integrated with the display), a magnetic card reader 108, a smart card reader 112, a ticket printer 204 configured to print a ticket 330 (optionally bearing a barcode 331 and/or other human and/or machine readable information), a barcode reader 110 (or a reader of some other machine-readable indicia), one or more speakers 106, one or more microphones 306, an interface to the network 304 (including, for example, the Internet) and/or a power supply 308. These elements may be coupled to the controller 302 via, for example, a common bus structure (not shown). The printed ticket 330 generated by such a ticket printer 204 may display clear text information and/or a machine-readable code or indicia (such as a barcode 331) that uniquely identifies the transaction and the goods and/or services involved.

Figure 4:
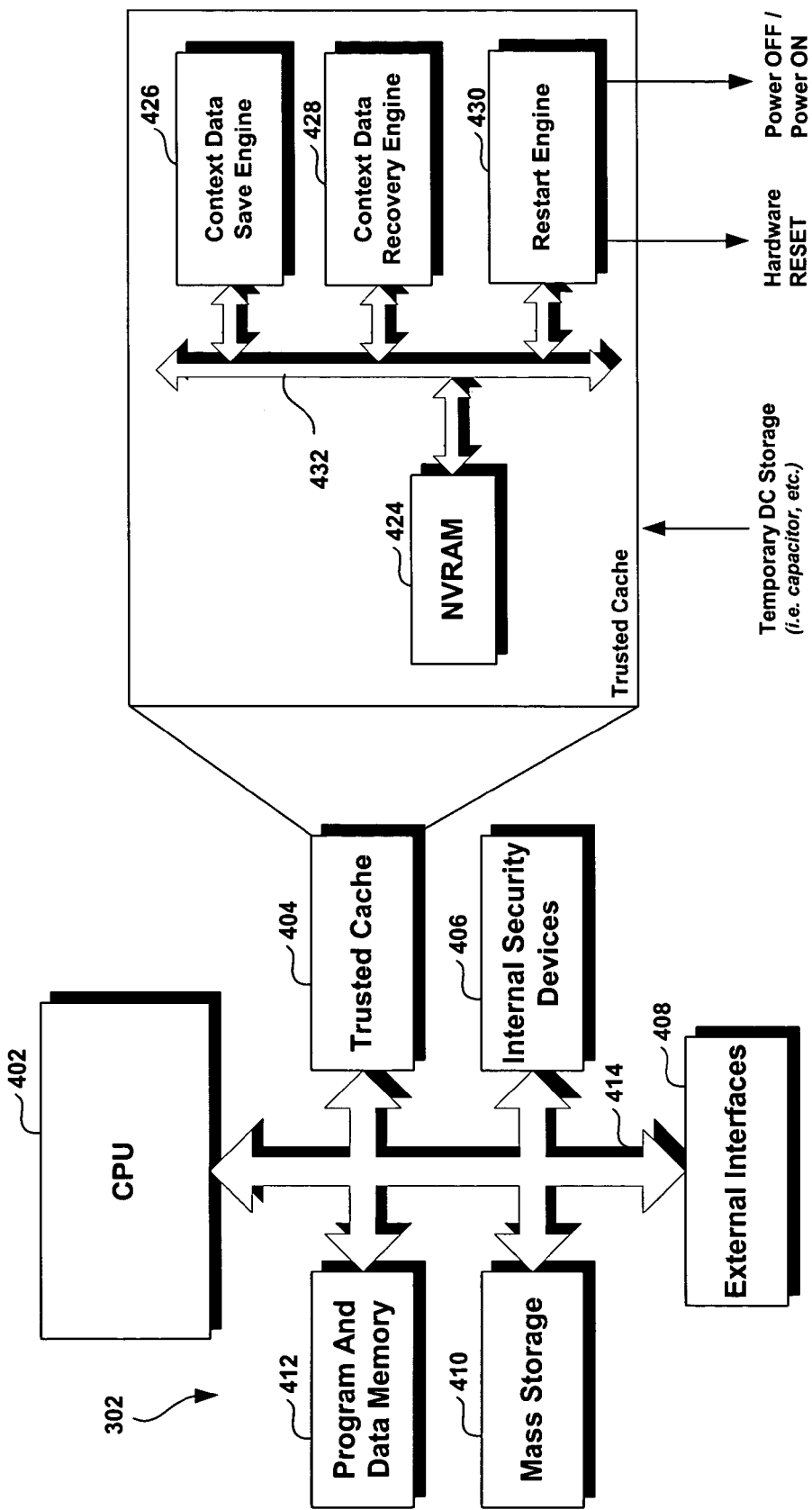
FIG. 4 is a block diagram of a controller and a trusted cache of an Internet transactional kiosk, according to an embodiment of the present invention.

FIG. 4 is a block diagram of a controller 302 and a trusted cache 404 of an Internet transactional kiosk 100, according to an embodiment of the present invention. As shown therein, the controller 302 may include a central processing unit (CPU) 402, program and data memory 412, mass storage 410 (including a magnetic hard disk or optical storage, for example), one or more external interfaces 408, one or more internal security devices 406 and/or a trusted cache memory 404. Each of the elements 402, 404, 406, 408, 410 and 412 may advantageously be coupled to one another via a common bus structure, as shown at reference 414. In addition, the controller 302 may incorporate one or more of the structures and functionalities of the controller disclosed in the co-pending and commonly assigned patent application Ser. No. 09/861,850 entitled "Trusted transactional Controller", cited above.

Trusted Cache

As shown in FIG. 4, the trusted cache 404 of the present invention may include a Non-Volatile Random Access Memory (NVRAM) 424 such as a "battery backed up" static memory or "Flash backed up" static memory (for example). The trusted cache 404 may also include a Context Data Save Engine 426 that is adapted to save the state and context of the current transaction being executed from the program memory 412 (Dynamic or Static RAM) into the NVRAM 424 as soon as power failure is sensed. A Context Data Recovery Engine 428 may then restore the transaction execution context from NVRAM 424 back into the DRAM or SRAM 412 as soon as the power supply is properly restored. The restart engine 430, according to an embodiment of the present invention, may be configured to drive a power ON signal even when the main power is cut or removed, using electrical energy supplied by a temporary DC storage device such as a capacitor or a small battery. The trusted cache 404 may be used to continually store the critical states (the context of a transaction; that is, all of the information that is necessary to re-generate and re-execute the transaction if the transaction is interrupted prior to completion thereof) of a transaction session (such as an e-commerce transaction session, for example) into non-volatile memory 424. Moreover, the context data save engine 426 enables automatic recovery of transaction execution following a temporary failure; that is, a software crash, a hardware latch-up or an accidental power-off, for example. As detailed hereunder relative to FIG. 15, the critical states of the transaction are preferably written to the trusted cache 404 without delay and very frequently, and are retained in non-volatile memory 424 in case of temporary failure of the present kiosk 100, either due to power outage, software crash, hardware latch-up or simply accidental user initiated or caused power down.

Saving such critical states on media such as a magnetic hard disk is believed to be too slow and too unreliable. Likewise, saving the critical states on Flash Memory is also believed to be too slow, and the writing life thereof may be too limited (such as on the order of 100,000 to 1 million cycles, for example). The cache technology for the trusted cache 404, therefore, is preferably chosen from either non-volatile SRAM or magnetic core memory, for example. Battery or capacitor backed-up SRAM may be included in the trusted cache 404, but the battery life and reliability may become problematic, and capacitor retention may be unduly limited (to a period of only a few days, for example). A technology that is well suited for the NVRAM 424 of the trusted cache 404 is the NVRAM technology developed by Simtek, Inc. (www.simtek.com). Using such NVRAM technology, the entire content of the program memory 412 (DRAM or SRAM) is automatically copied into in Flash memory at once, as soon as a catastrophic failure is detected. Moreover, no external electrical source is required to retain the data stored in the trusted cache's NVRAM 424 and data retention is guarantied for at least 10 years. When power is re-applied, the content of the Flash memory may be automatically rewritten into the program memory 412 (which may include SRAM and/or DRAM) and ready for access. The critical states saved to the NVRAM 424 of the trusted cache 404 may be encrypted to prevent tampering during the transaction recovery process, preferably using a hardware random number generator, as disclosed in the above-cited patent application Ser. No. 09/861,850.

Trusted E-Commerce Transactions

It is generally recognized that the reliability of embedded computing hardware is far greater than the reliability of the Internet 304 and that of wireless networks. The Internet 304 is a very cost effective medium for viewing rich information and for performing purchases in a secure manner, using smart cards and encryption techniques, for example. However, the availability of the Internet 304 is often unpredictable. Furthermore, a conventional e-commerce transaction may take minutes to complete and any failure between the kiosk 100 and the remote e-commerce server 334 (shown in FIG. 3 coupled to the network 304—including the Internet, for example) may leave the transaction in an unknown state and the user frustrated or mislead. Such conventional e-commerce transactions, therefore, are ill-suited to public access kiosks as contemplated herein.

The present invention, therefore, offers methods, systems and e-commerce transaction models for conducting trusted e-commerce transactions via a (public-access, for example) kiosk 100, whereby the e-commerce transaction is performed in seconds or even fractions of seconds. Moreover, the user of the present invention need not be concerned by the possible failure of the transaction commit to the remote server 334. Moreover, because of the lightweight nature of the data transfers between the kiosks 100 and the remote server(s) 334, deployment of very large numbers of such kiosks 100 according to the present invention (such as 10 millions units), will not slow the connected e-commerce remote server or servers 334 to a crawl, even if all the kiosks 100 were to commit transactions simultaneously because of a particular event. The remote servers 334 may be configured to accept the present transactional model and thereby easily handle a transaction volume on the order of 1,000,000 transactions per second. A suitable remote server is described in commonly assigned U.S. application Ser. No. 09/565,579 filed on May 4, 2000 and entitled "Fast Web Interface Server, Network Architectures and Systems Using Same", the disclosure of which is also incorporated herein in its entirety.

The e-commerce transactions described herein are an effective and low cost way to provide ultra fast and secure e-commerce and e-microcommerce (wherein the terms refers to low valued and/or frequent transactions—although the applicability of present invention is not limited to such microtransactions) solutions for a multitude of competitive providers (with whom the user need not necessary have an open account). Such e-microcommerce transactions may include transactions related to on-demand music listening or delivery, on-demand music video clips or concerts, charm videos, magazine articles, betting, casino gambling, concert or movie ticket delivery and voting, to name only a few representative candidates for such a micro-payment model.

"Provisional" and "Confirmed" Receipts

The transactional model proposed herein for conducting trusted e-commerce transactions via the kiosk 100 of the present invention is applicable to transactions such as occur in large lotteries, whereby the kiosk is the transaction "master".

Figure 5:
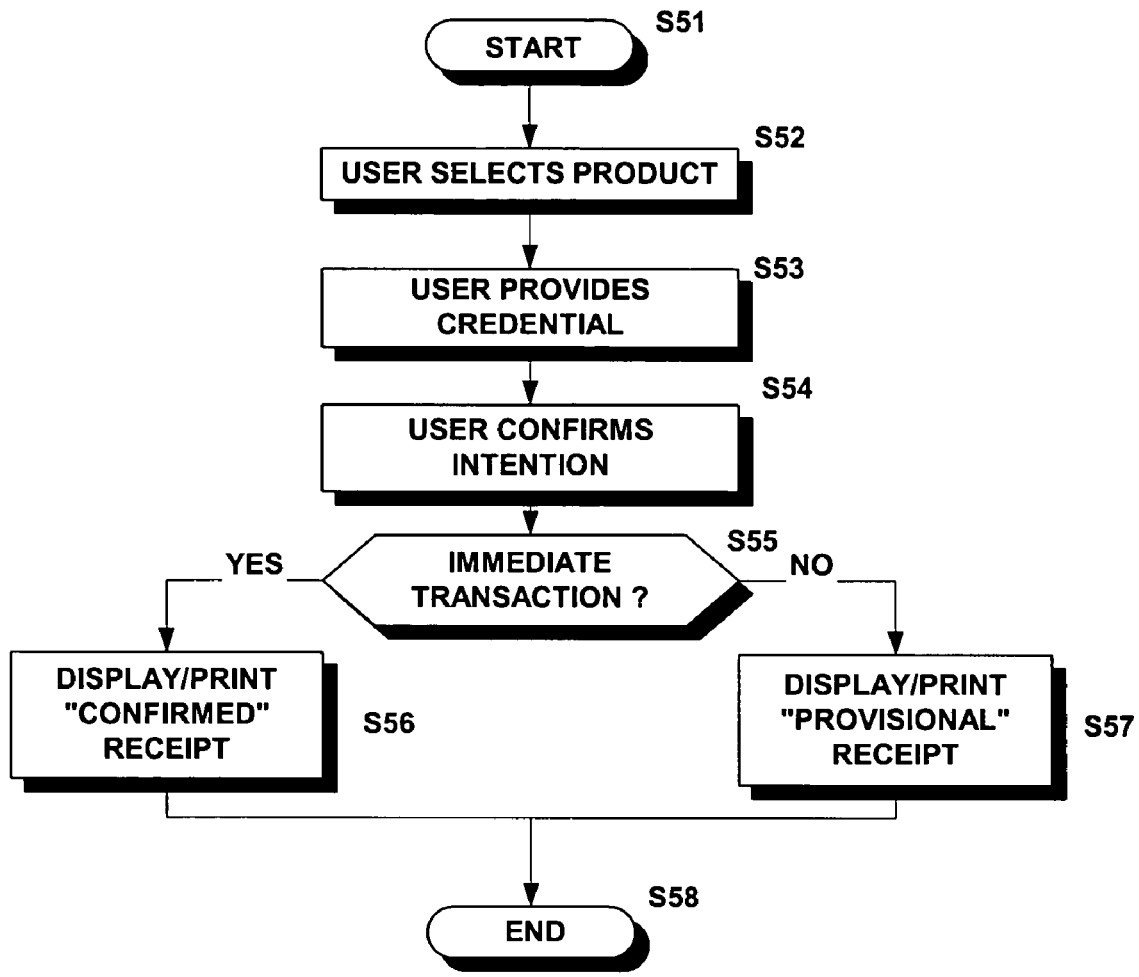
FIG. 5 is a flowchart of a transactional model for providing "Provisional" and "Confirmed" receipts of a trusted lightweight e-commerce transaction carried out with the Internet transactional kiosk of the present invention.

FIG. 5 is a flowchart of a transactional model for providing "Provisional" and "Confirmed" receipts of a trusted lightweight e-commerce transaction carried out with the Internet transactional kiosk 100 according to an embodiment of the present invention. As shown therein, such a transaction starts at S51 and the user (not shown) of the kiosk 100 selects (via the display and/or touch screen 104, for example) a product and/or services (displayed on the display 104) provided by provider of such products and/or services, as shown at S52. At S53, the user provides any requested credentials, such as any requested and/or required authentication and/or payment instrument information, as shown at S53. This may be carried out, for example, by swiping a magnetic or smart card through the readers 108, 112 of the kiosk 100. The user may then be presented with an opportunity to confirm the selected product (s) and/or services at S54.

Transactions that are accepted by the remote server 334 in a predetermined and/or selectable short period of time (such as on the order of 1 second for example) are named "immediate transactions" herein. When it is determined at step S55 that the current transaction is an immediate transaction (such as when a transaction confirmation is received from the remote server 334 within the predetermined and/or selectable short period of time), the user may be provided with a "confirmed acknowledgement" (receipt or ticket, as the terms acknowledgment, receipt and ticket are used interchangeably herein) as shown at S56. When immediate transactions are not possible (such as when a transaction confirmation is not received from the remote server 334 upon the expiry of the predetermined and/or selectable short period of time), the user may be provided with a "provisional acknowledgment" or receipt, as shown at S57. The transaction may then end at S58. If the user has received a provisional acknowledgment, the user may request a confirmed acknowledgment at some later point in time, if the user so desires. Very quickly, however, users will come to trust the reliability of the transaction strategy proposed herein, and will not bother to systematically request a confirmed acknowledgement/receipt when a provisional receipt has been issued. If in doubt, the user always has the option and ability of requesting a confirmed acknowledgement/receipt.

In the case of non-immediate transactions according to the present invention, the actual time to complete the overall transaction is preferably masked from the user. The user (person initiating the transaction) remains satisfied with the transaction because of the short period of time needed to complete the transaction (as he or she has been provided with a provisional acknowledgment of his or her purchases within a very short period of time after confirming his or her intention to purchase the item in question). The reliability and the speed of completion of the overall transaction is insured by relying on the "transaction master" model and the use of the trusted cache 404, as disclosed herein.

Immediate Transaction

Figure 6:
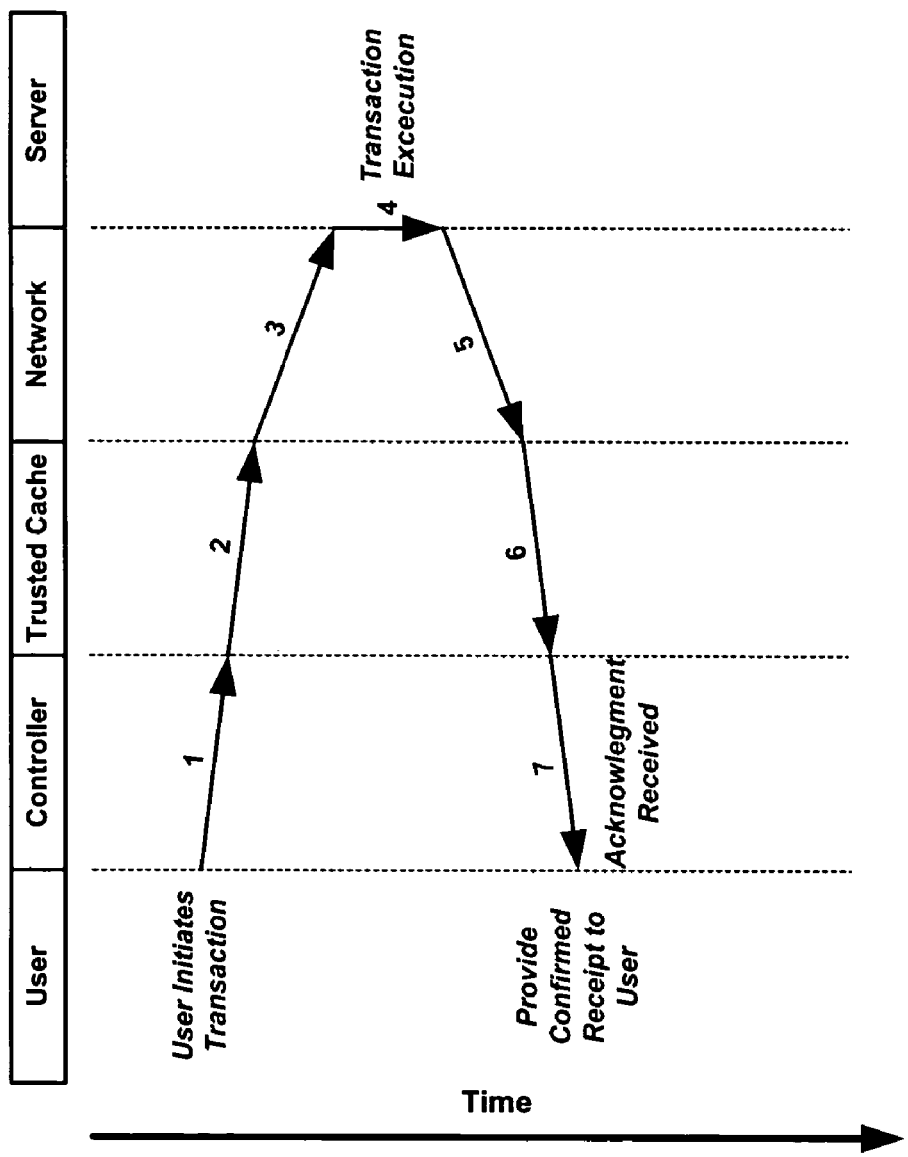
FIG. 6 is a diagram showing the timing of an immediate trusted lightweight transaction carried out with the Internet transactional kiosk of the present invention.

FIG. 6 is a diagram showing the timing of an immediate trusted transaction as the transaction progresses from the user to the server 334 and back to the user, as a function of time, according to an embodiment of the present invention. When an immediate transaction is possible, the transaction may proceed as follows. When initiating a transaction, the user may supply one or more of the following: an identification of the desired product and/or service, the identity of the supplier(s), the user's personal information and/or payment instrument information (which may be inputted by the user via the touch screen 104 or retrieved automatically from secured personal storage—such as from a magnetic or smart card, for example). As shown at (1), the controller 302 of the kiosk 100 according to the present invention may encapsulate all the user-supplied aforementioned information in a single data packet (all such sensitive data being preferably secured in accordance with a predetermined security/encryption protocol), and may then store a copy of the packet into the trusted cache 404, as shown at (2). The packet may then be routed through the network (3) (including, for example, the Internet 304) until it reaches the remote server 334. The information related to the item(s) chosen, together with the personal information and/or payment instrument information and the delivery address are preferably sent to the remote server 334 in the same single data packet. The sensitive information may be encrypted using, for example, the provider's public key that is automatically made available together with the rich content describing the product or service, thereby avoiding the unnecessary overhead of establishing a full SSL or Transport Layer Security (TLS) session. The remote server 334 may then complete the transaction (4) and may return a confirmed acknowledgment packet back through the network (5). A copy of the returned confirmed acknowledgment packet may then be copied to the trusted cache 404 (6), and a receipt 330 may be generated by the kiosk 100 (7) that is then displayed or printed or otherwise provided to the user.

Cached Transaction

Figure 7:
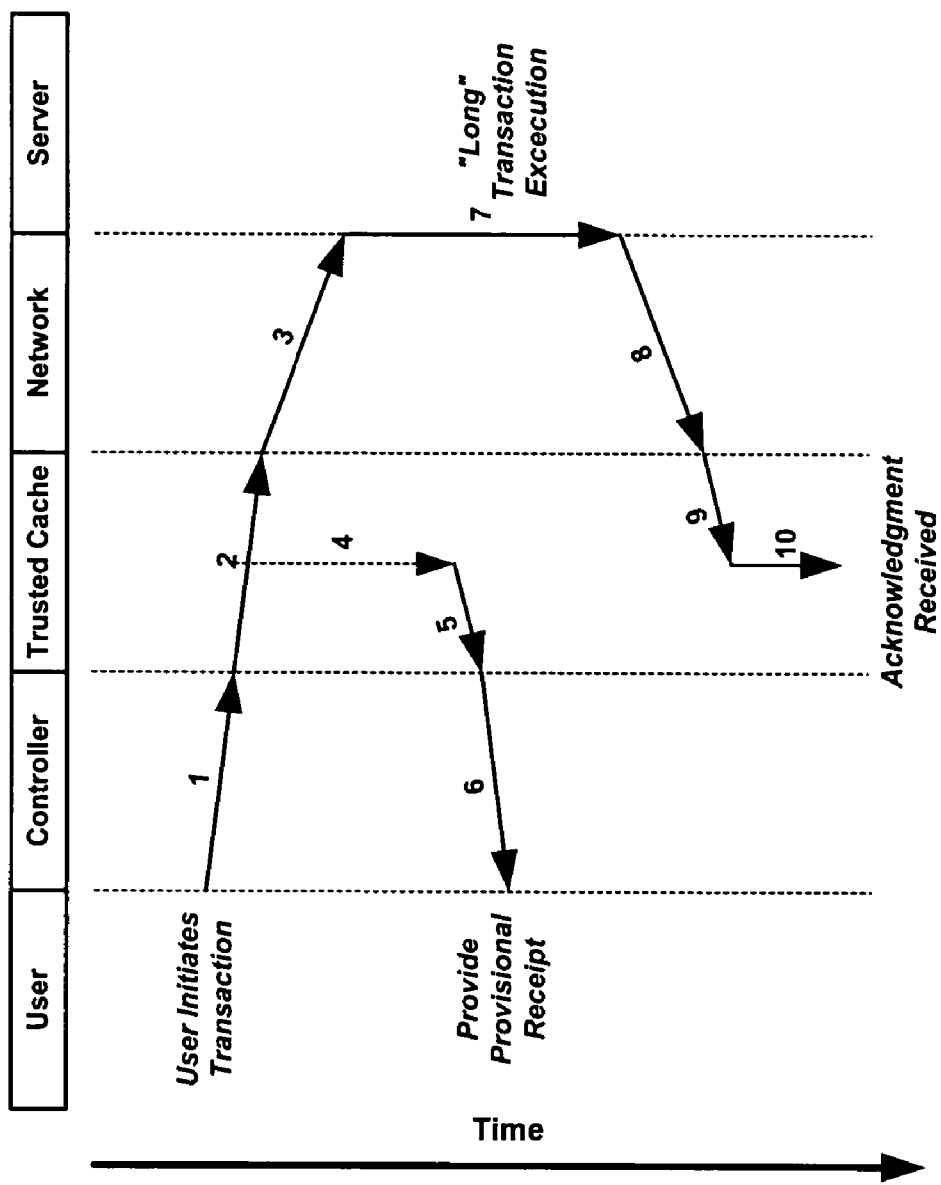
FIG. 7 is a diagram showing the timing of a cached trusted lightweight transaction, carried out with the present Internet transactional kiosk, according to an embodiment of the present invention.

When an immediate transaction is not possible, a cached transaction is executed. FIG. 7 is a diagram showing the timing of a cached trusted transaction as the transaction progresses from the user to the server 334 and back to the user, as a function of time, according to an embodiment of the present invention. When initiating a transaction, the user of the kiosk 100 supplies one or more of the following: an identification of the desired product and/or service, the identity of the supplier(s), the user's personal information and/or payment instrument information (which may be inputted by the user via the touch screen 104 or retrieved automatically from secured personal storage—such as from a magnetic or smart card, for example), for example. The kiosk 100, as shown at (1), may the encapsulate all of the aforementioned information in a single data packet (all such sensitive information being secured in accordance with a predetermined security/encryption protocol), and may then store a copy of the packet in the trusted cache 404 (2). The packet may then be routed through the network 304 (3) (including, for example, the Internet).

After a predetermined time-out (4), a provisional acknowledgement packet (5) is produced based on the user transaction request already committed to the trusted cache 404. The kiosk 100 of the present invention may then generate a provisional acknowledgement (6) such as ticket 330 that is viewed or printed by the ticket printer 204 or otherwise made available or provided to the user.

After a certain amount of time, the remote server 334 completes the transaction (7) and may return a confirmed acknowledgment packet back through the network 304 (8). A copy of the returned confirmed acknowledgment packet may then be copied to the trusted cache 404 (9), and the confirmed acknowledgment may be retained in the trusted cache 404 (10). This execution flow has the advantage of providing the user with a provisional acknowledgment very shortly after the user has initiated the transaction, even if a confirmed acknowledgment is not available until some later time. The user retains the option of returning to the kiosk 100 of the present invention and requesting a confirmed acknowledgment corresponding to the previously provided provisional acknowledgment by presenting the provisional acknowledgment or ticket to the barcode reader 110. The barcode reader 110 may then read the barcode 331 printed on the acknowledgment 330 and the kiosk 100 may then cause the ticket printer 204 to print out a confirmed acknowledgment 330.

Failed Transaction

Figure 8:
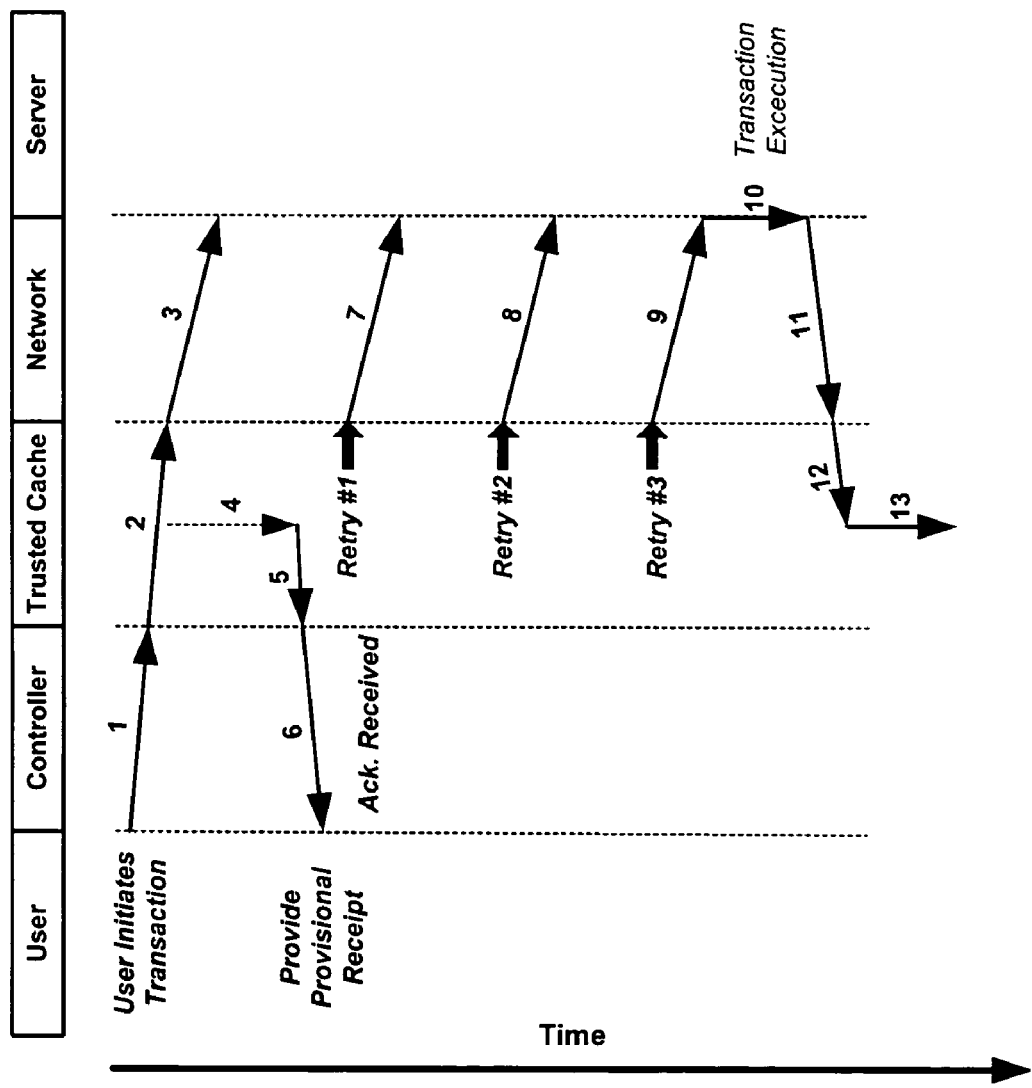
FIG. 8 is a diagram showing the timing of a failed trusted lightweight transaction, carried out with the present Internet transactional kiosk, according to an embodiment of the present invention.

FIG. 8 is a diagram showing the timing of a failed trusted transaction as the transaction progresses from the user to the server 334 and back to the user, as a function of time, according to an embodiment of the present invention. When initiating a transaction, the user may supply one or more of the following: an identification of the desired product and/or service, the identity of the supplier(s), the user's personal information and/or payment instrument information (which may be inputted by the user via the touch screen 104 or retrieved automatically from secured personal storage—such as from a magnetic or smart card, for example), for example. The kiosk 100 (the controller 302 thereof) may then encapsulate all of the aforementioned information in a single data packet (all such sensitive information being secured in accordance with a predetermined security/encryption protocol) as shown at (1), and may then store a copy of the packet in the trusted cache 404 (2). The packet may then be routed through the network (3) (including, for example, the Internet 304).

After a predetermined time-out (4) has elapsed without the generation of a confirmed acknowledgment packet by the server 334, a provisional acknowledgement packet (5) may be produced by the kiosk 100 itself, based on the user transaction request already committed to the trusted cache 404. The kiosk 100 of the present invention may then generate a provisional acknowledgement (6) such as the ticket 330 that is viewed or printed by the ticket printer 204 or otherwise made available or provided to the user.

When the cached transaction packet (3) fails to reach the remote server 334, a first re-try packet (7) is sent (under the control of the kiosk 100) through the network 304 after a predetermined and/or selectable period of time. If no acknowledgement is received from the remote server 334 after a predetermined and/or selectable period of time, a second retry packet (8) may be sent to the network 304. The same scenario may be repeated forever or (preferably) for a selectable number or retries or period of time or until an acknowledgement is received from the remote server 334.

In the example illustrated in FIG. 8 the third retry packet (9) reaches its destination (the remote server 334) and the transaction is successfully executed (10). A confirmed acknowledgment is routed back through the network (11). A copy of the returned acknowledgment packet is copied to the trusted cache 404 (12), and a confirmed acknowledgment may be retained in the trusted cache 404 (13) and optionally provided to the user upon request.

Such a transaction model, whereby the kiosk 100 is the transaction "master" that initiates the transaction with the remote server 334 and repeats forever or for a predetermined number of times until a valid transaction acknowledgment from the remote server 334 is received, is extremely robust albeit lightweight (the transaction consists only of single forward packet and a single return packet). This enables the remote server 334 to handle a great many such transactions simultaneously without becoming overwhelmed by the data traffic necessary to complete such a great number of transactions. Moreover, there is no need to identify the exact location and type of failure or to initiate a specific recovery. Indeed, any failure, whether on the outbound network path (i.e., toward the remote server. 334), at the remote server 334 or on the network return path (from the remote server 334 back toward the kiosk 100/user) may be automatically recovered according to this transaction model. Any duplicate packet that may be received at either end may simply be ignored.

It is to be noted that the user is not aware of the possible delay in receiving the acknowledgement from the remote server 334. This feature is expected to be appreciated by users, especially when performing numerous micro-payments, as servers conventionally take a long time to get approval from clearing banks.

Confirmed Acknowledgment Request

Figure 9:
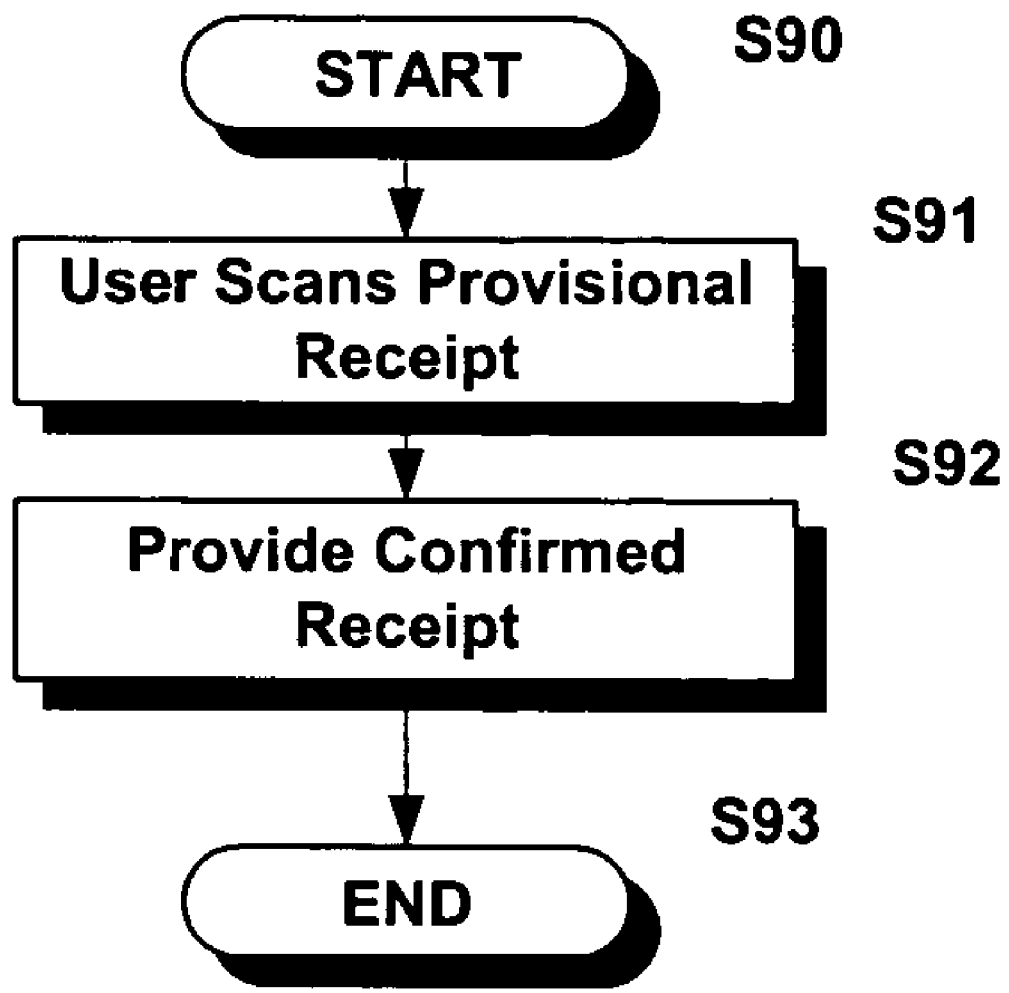
FIG. 9 is a flowchart of a request for a confirmed acknowledgment, according to an embodiment of the present invention.

FIG. 9 is a flowchart of a request for a confirmed acknowledgment, according to an embodiment of the present invention. Whenever the user is given a provisional acknowledgment, the user may, at some later time, request a corresponding confirmed acknowledgment. If the kiosk 100 according to the present invention is equipped with a ticket or receipt printer 204 and a barcode reader (such as a scanner, for example) 110 (or other machine vision system), the user may initiate a request for a confirmed acknowledgment at S90 in FIG. 14 by simply presenting the previously received provisional acknowledgment to the bar code reader 110 and scan a barcode 331 (or other machine readable indicia) printed on the provisional acknowledgment as shown at S91 and the printer 204 prints out a confirmed acknowledgment (a ticket or receipt) as shown at S92 to complete the request at S93, in accordance with the procedures detailed below.

"In-Cache" Confirmation Transaction

Figure 10:
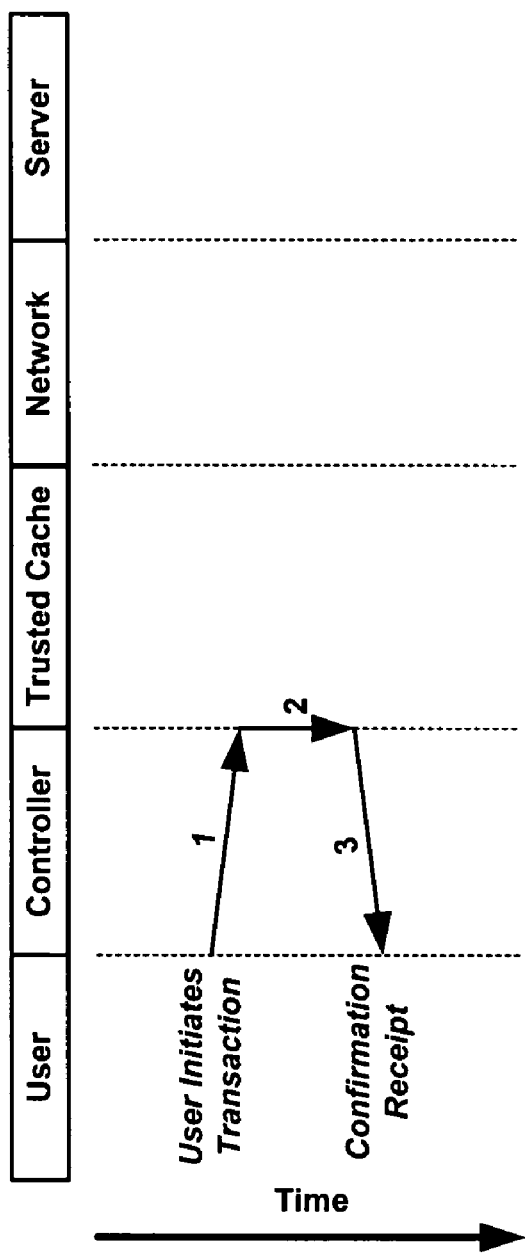
FIG. 10 is a diagram showing an in-cache confirmation of a trusted lightweight transaction carried out with the Internet transactional kiosk according to an embodiment of the present invention.

FIG. 10 is a diagram showing an in-cache confirmation of a trusted transaction, according to an embodiment of the present invention. Depending on the time taken by the remote server 334 to complete the transaction, the confirmed acknowledgment may already be available in the trusted cache 404. In that case, the user need only present the previously received provisional acknowledgment to barcode reader 110 of the kiosk 100 of the present invention and the request (1) may be immediately responded to with the relevant data contained in the trusted cache 404 (2), and a confirmed acknowledgment generated (3) and printed, displayed or otherwise made available to the user.

"Out-Of-Cache" Confirmation Transaction

Figure 11:
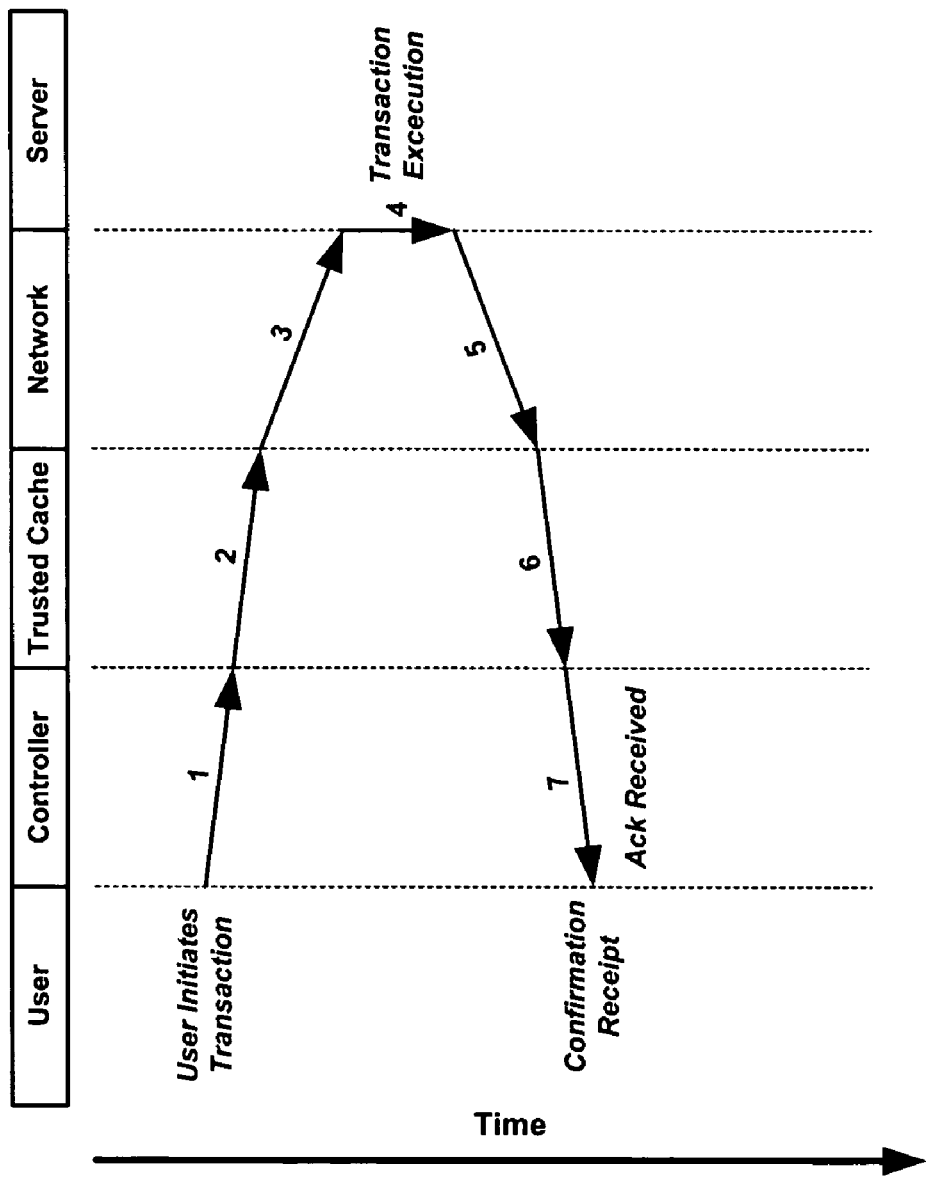
FIG. 11 is a diagram showing the timing of an out-of-cache confirmation of a trusted lightweight transaction, carried out with the Internet transactional kiosk according to an embodiment of the present invention.

FIG. 11 is a diagram showing the timing of an out-of-cache confirmation of a trusted transaction, according to an embodiment of the present invention. If the confirmed acknowledgement is not present in the trusted cache 404 (for whatever reason), the request therefor is forwarded to the remote server 334 via the outbound path (1) (2) and (3) through the controller 302, trusted cache 404 and the network (such as the Internet 304), whereupon the remote server 334 sends back a transaction confirmed acknowledgment (4) that is routed back to the kiosk 100 via the return path (5) (6) and (7). If the remote server 334 does not respond due to some failure along the way, the kiosk 100 of the present invention may continuously repeat the request for confirmed acknowledgment until a reply is received. When the remote server 334 has completed the earlier-initiated e-commerce transaction, it will cache the confirmed acknowledgment such that a subsequent request from the kiosk 100 can be immediately responded to and the confirmed acknowledgment sent from the remote server's 334 cache to the trusted cache 404 of the kiosk 100 of the present invention. If the confirmed acknowledgement is not ready, it will simply ignore the request therefor, thereby forcing the kiosk 100 to repeat the request after a predetermined time until the confirmed acknowledgment is received. In the end, a confirmed acknowledgment is generated and provided to the user, the confirmed acknowledgment indicating either success of the transaction or failure thereof (due, for example, by the user's payment instrument being declined).

Transaction Session

Figure 12:
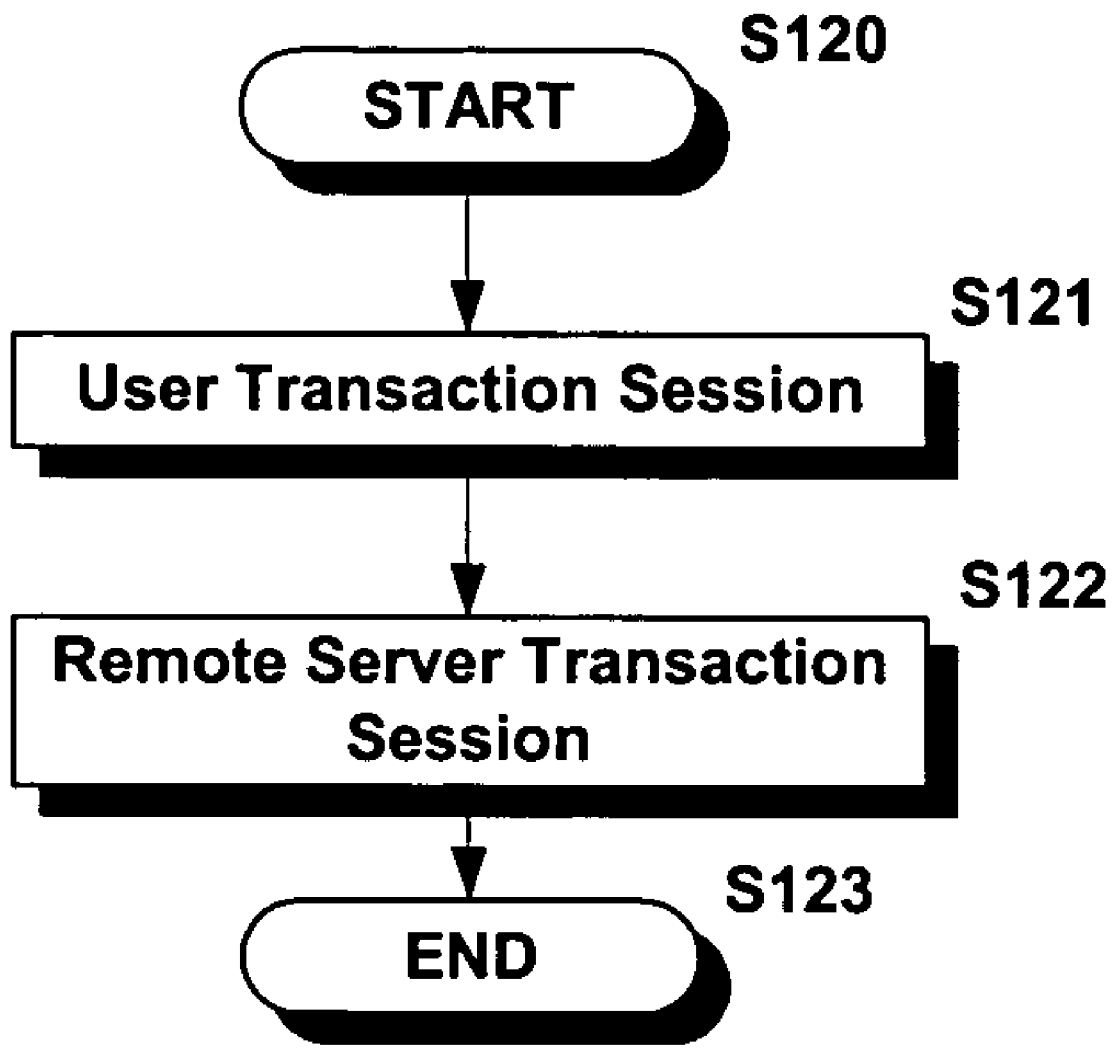
FIG. 12 is a flowchart of a transaction session, according to an embodiment of the present invention.

FIG. 12 is a flowchart of a transaction session, according to an embodiment of the present invention. The overall trusted transaction session called a "Transaction Session" that begins at S120 and ends at S123 that is executed by the control software of the kiosk 100 comprises two sessions; namely a user transaction session S121 followed by a remote server transaction Session 122, the details of which are discussed below.

User Session

Figure 13:
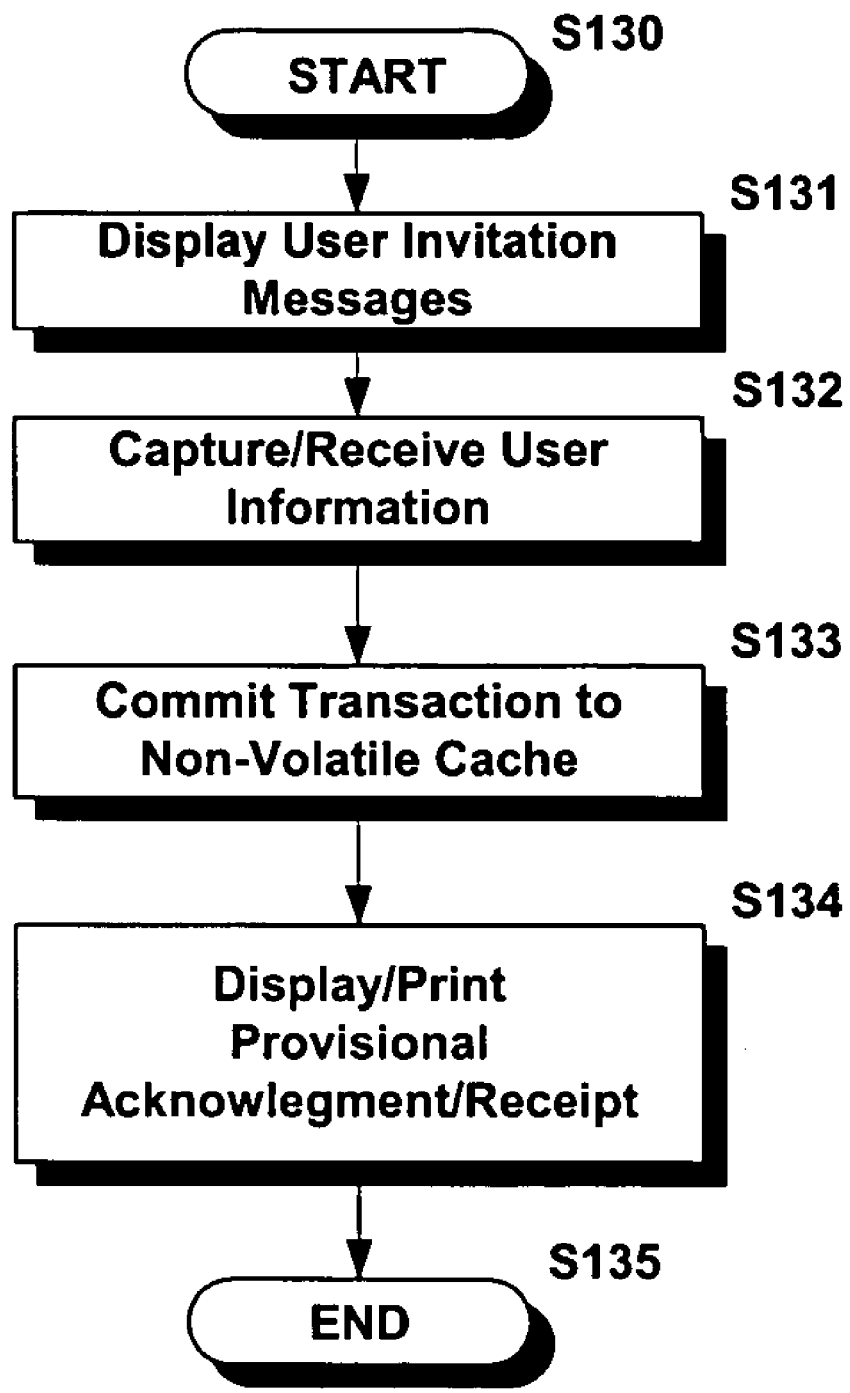
FIG. 13 is a flowchart of a user session, according to an embodiment of the present invention.

FIG. 13 is a flowchart of a user session, according to an embodiment of the present invention. The user session begins at S130 and ends at S135 and may include one or more of the following intervening steps. As shown at S131, the display 104 may invite the user to initiate a purchase for a product and/or service. The user may then confirm his or her intention to initiate a purchase. The user's credentials; that is, his or her personal and/or financial information (identity, payment instrument details, etc.) may then be captured and/or inputted into the kiosk 100 according to the present invention, as shown at S132. The kiosk 100 thus captures the user's personal and/or payment credentials using some means of interaction. The kiosk control software may then commit the transaction to the non-volatile memory 424 of the trusted cache 404, as shown at S133, after which the kiosk 100 may provide, display or print a provisional acknowledgment for the user, as shown at S134. According to the present invention, the user need only be involved during the user session S130-S135, which may take only a few seconds or even less if bar-coded (or machine readable) items are scanned by the barcode (for example) reader 110.

Server Session

Figure 14:
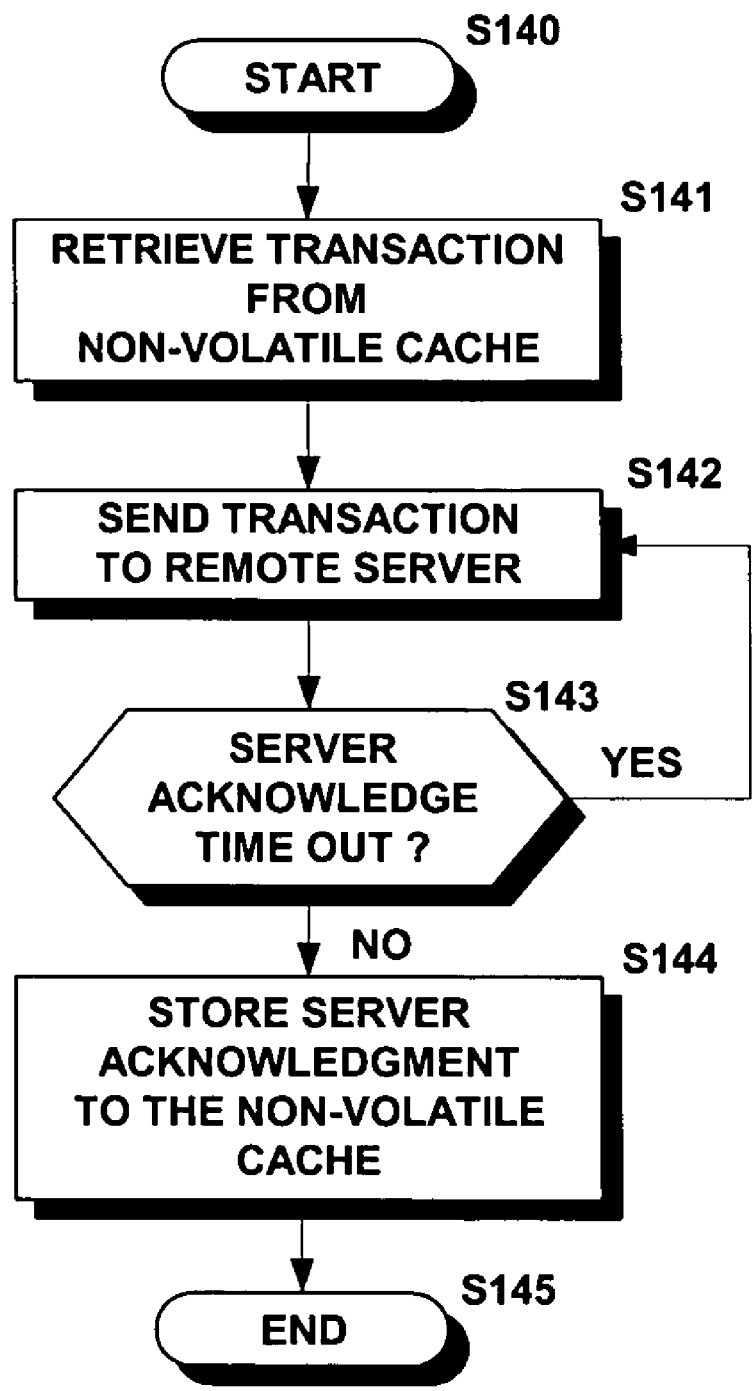
FIG. 14 is a flowchart of a server session, according to an embodiment of the present invention.

FIG. 14 is a flowchart of a server session from its initiation at S140 to the conclusion thereof, at S145, according to an embodiment of the present invention. According to the present invention, the server session may include one or more of the following steps. As shown at S141, the kiosk control software retrieves the transaction committed in the non-volatile trusted cache 404 during the user session. The kiosk 100 then sends the transaction to the remote server 334 over a computer network (such as the Internet 304, for example) or other communication channel, as shown at S142. If no acknowledgement is received from the remote server 334 by a predetermined and/or selectable timeout period, the kiosk 100 of the present invention may continually (or for a predetermined period of time or for a predetermined or selectable number of attempts) resend the transaction packet to the remote server 334, as indicated at S143. If the acknowledgment is indeed received by the kiosk 100 before the timeout period has elapsed, the received acknowledgment may be stored in the NVRAM 424 of the trusted cache 404. As is apparent from FIG. 14, the user of the kiosk 100 of the present invention (or the user of the device incorporating the present kiosk 100) need not be involved in the remote server session. Optionally, the kiosk control software may notify the user of the successful completion of the transaction by printing or otherwise providing the confirmed acknowledgment automatically.

In order for a transaction session to complete successfully without involving the user, it is necessary to examine all the failure situations that may interfere with the completion of the transaction. A formal methodology called Failure Modes, Effects and Criticality Analysis (FMECA) is useful in exhaustively identifying all possible failure possibilities, their impact and the effectiveness of the remedies.

The most common cause of transaction failure may be caused by the remote server 334 failing to timely respond with an acknowledgment of the transaction, for whatever reason (including, for example, a failure at some point along the communication path outside the kiosk 100). An effective remedy to such a failure is the transaction model described above, whereby the kiosk 100 is the transaction "master" that initiates and maintains control over the transaction with the remote server 334. Advantageously, the kiosk 100 according to the present invention may repeatedly send the transaction to the remote server 334 until a valid transaction acknowledgment is received from the remote server 334. The second common cause of transaction failure may be attributed to failure of the kiosk 100, due to mains power-failure, user power down, software crash and/or hardware latch-up, for example. An effective remedy to such failures is the use of NVRAM 424 of the trusted cache 404 in which the critical states of the transaction are frequently saved. The control software of the kiosk 100 may then recover the context of the transaction from the critical state information stored in the trusted cache 404, and then resume its execution and control over transaction until completion thereof, as described hereunder.

Transaction Critical States

Figure 15:
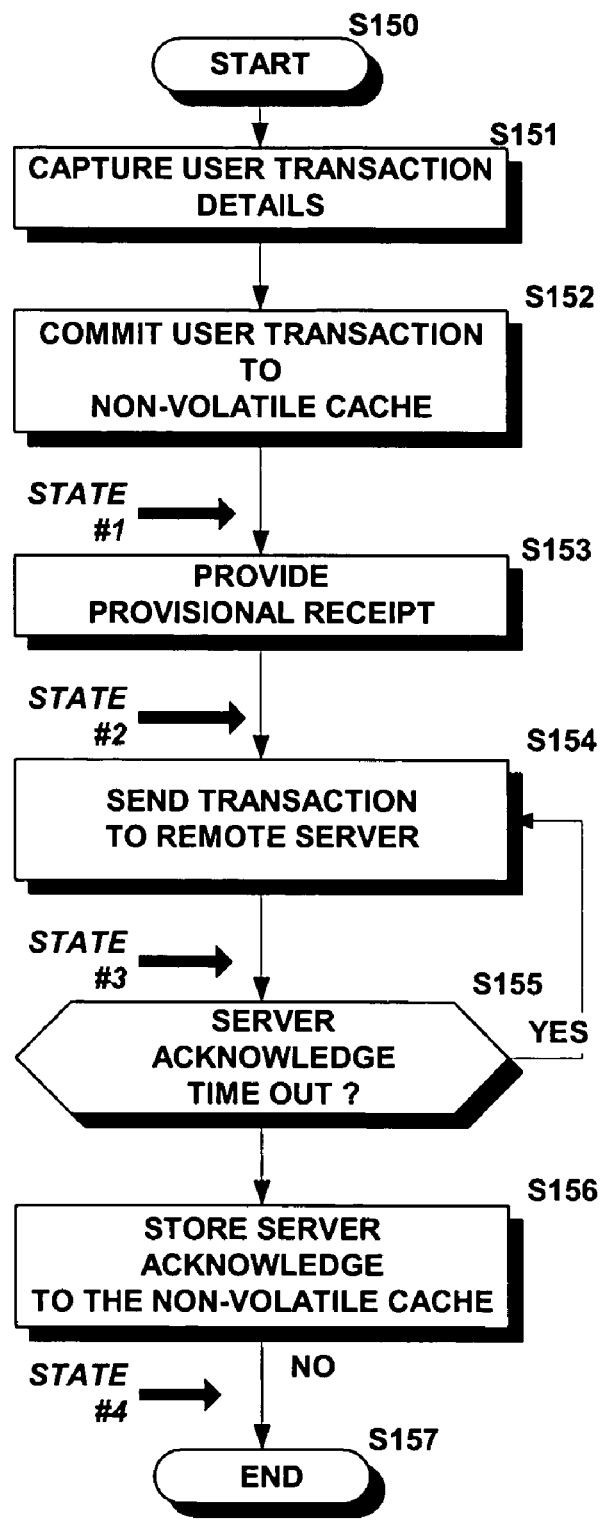
FIG. 15 is a flowchart showing the timing of the saving of the critical states (context) of a transaction carried out with the Internet transactional kiosk according to an embodiment of the present invention.

FIG. 15 is a flowchart showing the timing of the saving of the critical states of a trusted transaction, according to an embodiment of the present invention. The essential critical states are State#1, State#2, State#3, and State#4, as shown in the flowchart. The present invention provides for the saving in the trusted cache 404 of all the data necessary to describe the context of the transaction at that particular instant, including the state number itself. This saving of the critical states (context) may be carried out four times per transaction as shown in FIG. 15, or more or less often as necessary. Following a failure of the transaction, the kiosk 100 and/or the remote server 334 occurring between any of these critical states, the present kiosk 100 may retrieve the last saved state information from the trusted cache 404 and seamlessly resume and complete the execution from the saved state onward. As shown in FIG. 15, the method beings at S150, whereupon the present kiosk 100 captures (or retrieves) the user's personal and/or financial information. In step S152, after the user has selected products and/or services and committed to a transaction, the details of the user's transaction are committed to the NVRAM 424 of the trusted cache 404. The kiosk 100 of the present invention may then save all of the information necessary to reconstruct and continue the transaction to the NVRAM 424 of the trusted cache 404, as shown at State#1. At S153, the kiosk 100 may print, display or otherwise provide the user with a provisional acknowledgment or receipt. This state of the transaction (State#2) may then also be saved to the NVRAM 424 of the trusted cache 404. The user's transaction may then, as shown at S154, be sent to the remote transaction server 334, and the current state information may then again saved to the NVRAM 424 of the trusted cache 404, as shown at State#3. As indicated at S155, step S154 may be repeated (indefinitely if necessary) until a timely acknowledgment is received from the remote server 334. Alternatively, step S153 may be omitted between steps S152 and S154 and carried out only when the remote server 334 initially fails to send a timely acknowledgement back to the present kiosk 100. Upon receiving an acknowledgment from the remote server 334, the present kiosk 100 may store the received acknowledgement and all necessary contextual information to the NVRAM 424 of the trusted cache 404, as shown at State#4, whereupon the method ends at S157.

Recovery from Trusted Transaction Controller Temporary Failure

Figure 16:
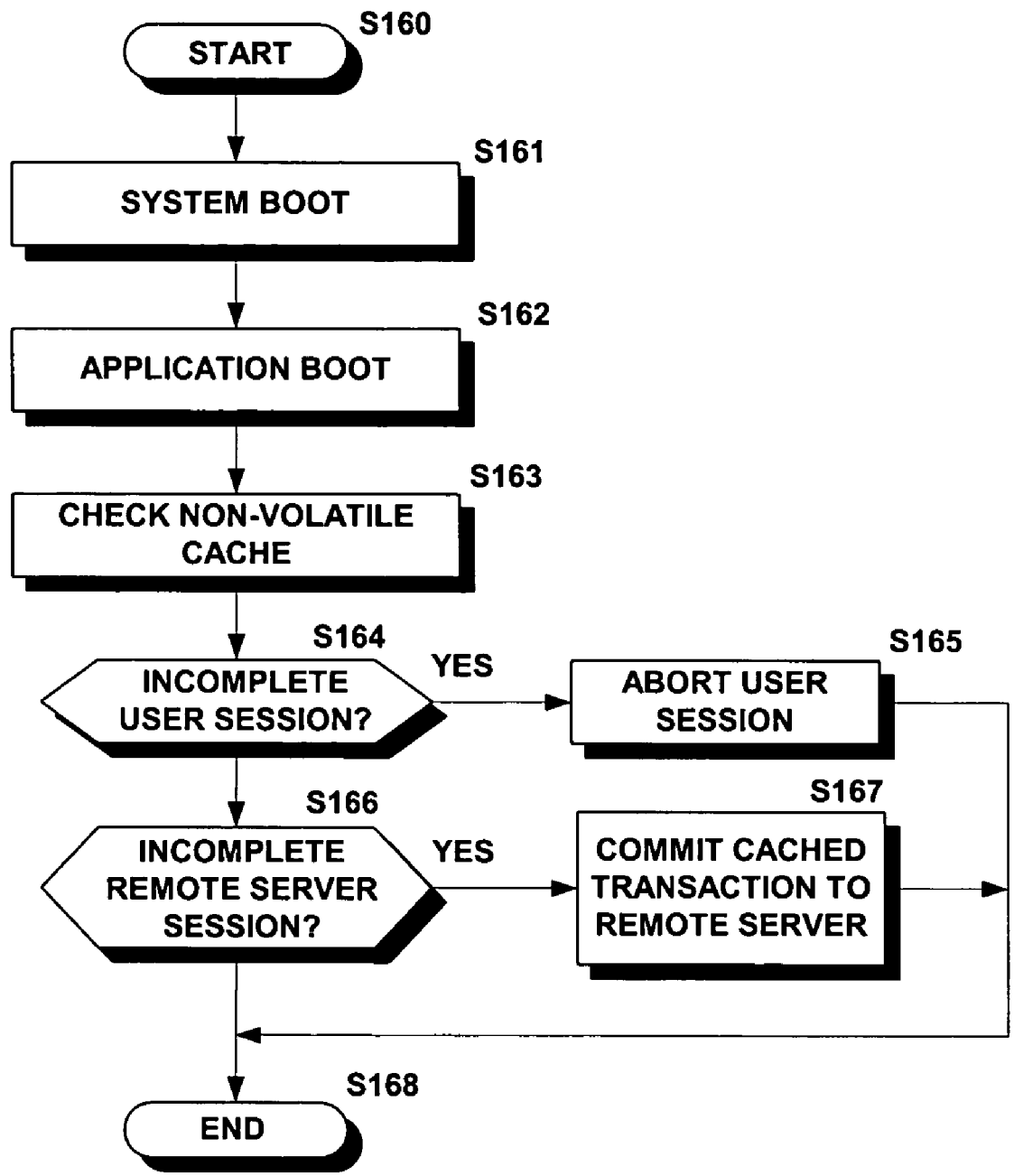
FIG. 16 is a flowchart illustrating the recovery from a temporary failure of an Internet transactional kiosk according to an embodiment of the present invention.

FIG. 16 is a flowchart illustrating the recovery from a temporary failure of a kiosk 100, according to an embodiment of the present invention. Assuming a successful recovery cycle following a temporary failure whereby the kiosk 100 is successfully re-started, the kiosk 100 may execute the steps S160-S168 shown in the flowchart of FIG. 16. Namely, the operating system of the present kiosk 100 may reboot as shown at S161 and the application may start-up or boot as shown at S404. Thereafter, the CPU 402 (see FIG. 4) may examine the contents of the trusted cache 404, as shown at S163. If the last saved critical state (see FIG. 15) indicates that a user session is not completed at S164, the kiosk 100 may abort the user session, as shown at S165 and end the recovery, as shown at S168. If it is determined step in S166, however, that the last critical state saved shows that a remote server 334 session is incomplete, the saved state information may be retrieved from the trusted cache 404 and the transaction committed (sent) to the remote server 334, as shown at S167. The content of the trusted cache 404 may be encrypted or digitally signed, in order to prevent tampering during the transaction recovery process, by service people (for example) if the present kiosk 100 is sent for repair or service.

It is to be noted that the user may choose not to receive a provisional acknowledgment (ticket). In that case, only the confirmed acknowledgment will be printed or otherwise provided whenever the acknowledgement is received from the remote server 334. In either case, the user need not wait in front of the display screen for the overall transaction to complete, and would therefore be afforded additional time to fully enjoy the shopping and/or entertainment experience provided by the present kiosk 100.

As noted above, the present kiosk 100 (and not the remote server 334) is the transaction "master". Therefore, user personal and payment instrument information and the like are supplied to the remote server 334 under the full control of the kiosk 100, including recovery from failure. Consequently, users will very quickly come to trust such a system, especially when many small merchants are involved in such e-microcommerce transactions that depend upon frequent micropayments.

It is not recommended, within the context of the present invention, to encapsulate the transaction model described within XML, because of the large overhead created by XML. Instead, the transaction model proposed herein may advantageously be used as a means to efficiently and securely process the transaction "payload" while the associated rich and "free" content may be handled according to traditional protocols, such as HTML, Java, XML, for example.

Unlike other models that require an account with an online provider to have previously been set up, the present invention does not require that the user be previously known to the provider in order to complete a transaction. Indeed, as the present kiosk 100 is equipped with devices to access personal information stored securely (on a personal Smart Card in the smart card reader), the information related to the item chosen together with the user credentials (including the user's personal and/or payment instrument information, for example) and the delivery address are preferably sent to the remote server 334 in the same single data packet. The sensitive information may be encrypted using for example the provider's public key that is automatically made available together with the rich content describing the product or service, thus avoiding the unnecessary overhead of establishing a full SSL (Secure Socket Layer) or TLS (Transport Layer Security) session.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. An electronic kiosk comprising:
a processor for controlling the kiosk;
a network interface to interface with a computer network;
a user interface enabling user interaction with the processor and initiation of a transaction with a remote server coupled to the computer network, the transaction including a plurality of execution sequences and associated plurality of critical states, and
a non-volatile cache memory configured to selectively store a context of the transaction, the context of the transaction including all information that is necessary for the processor to resume execution of the transaction at a beginning of an interrupted one of the plurality of execution sequences;
a context data save engine controlled by the processor for selectively storing the context of the transaction to the non-volatile cache memory at each of the plurality of critical states, and
a context data recovery engine controlled by the processor for retrieving the stored context from the non-volatile cache memory to enable the processor to resume and to complete execution of the transaction from the beginning of the interrupted execution sequence.

2. The kiosk of claim 1, wherein the non-volatile cache memory is solid-state.

3. The kiosk of claim 1, wherein the non-volatile cache memory includes a Non-Volatile Random Access Memory (NVRAM).

4. The kiosk of claim 3, wherein the processor is configured to execute the transaction in a first user session that concludes after the context data save engine has saved the context of the transaction to the NVRAM and a provisional acknowledgment is provided to the user and to execute a second remote server session that concludes after a confirmed acknowledgement is received from the remote server and provided to the user.

5. The kiosk of claim 4, wherein the user session is shorter in duration than the remote server session.

6. The kiosk of claim 1, wherein the context data save engine is configured to store the context of the transaction at least one of:
before sending the transaction to the remote server;
after sending the transaction to the remote server but before having received an acknowledgment of the transaction from the remote server;
after having received a continued acknowledgment of the transaction from the remote server.

7. The kiosk of claim 1, further including a printer controlled by the processor, the printer being configured to print at least one of human-readable information and machine-readable information.

8. The kiosk of claim 7, wherein the printer is configured to print an acknowledgment of the transaction.

9. The kiosk of claim 1, further including a reader controlled by the processor, the reader being configured to scan and decode printed machine-readable information.

10. The kiosk of claim 9, wherein the machine-readable information includes a barcode and wherein the reader includes a barcode reader.

11. The kiosk of claim 1, further comprising at least one of a magnetic and a smart card reader.

12. The kiosk of claim 1, wherein the user interface includes at least one of a display and a touch screen.

13. The kiosk of claim 1, wherein the processor is programnned to cause the kiosk to:
enter a user session that exposes the user to messages and accepts user input to initiate the transaction via the user interface, commit the transaction to the non-volatile cache and provide the user with a provisional acknowledgment, and
enter a remote server session that commits the transaction to the remote server via the computer network by sending a single data packet that encapsulates all information necessary to initiate the transaction and to repeatedly re-send the single data packet until a valid acknowledgment is received from the remote server.

14. The kiosk of claim 13, wherein the processor is further programmed to ignore any duplicate data packet that is received from the remote server.

15. The kiosk of claim 1, wherein the kiosk is configured for public access.

16. A method of carrying out an online transaction between an electronic kiosk and a remote server, each of the kiosk and the remote sewer being coupled to a network, the method comprising the steps of:
initiating a transaction at the kiosk;
staring a copy of the transaction in a non-volatile memory within the kiosk;
sending the transaction to the remote server under a control of the kiosk, and
generating a provisional acknowledgment of the transaction from the copy of the transaction stored in the non-volatile memory when a confirmed acknowledgment is not received from the remote server within a predetermined period of time.

17. The method of claim 16, further comprising the step of:
receiving the confirmed acknowledgment from the remote server after the predetermined period of time and storing the received continued acknowledgment in the non-volatile memory.

18. The method of claim 17, further including a step of providing the stored confirmed acknowledgment upon request.

19. The method of claim 16, further comprising the step of re-sending the copy of the user transaction stored in the non-volatile memory to the remote server upon failure to receive the confirmed acknowledgment from the remote server.

20. The method of claim 19, wherein the re-sending step is carried out until a confirmed acknowledgment of the transaction is received from the remote server.

21. The method of claim 19, wherein the re-sending step is carried out a predetermined number of times.

22. The method of claim 16, wherein the generating step includes a step of printing the provisional acknowledgment together with corresponding machine-readable information that uniquely identifies the transaction.

23. The method of claim 16, wherein the generating step includes a step of printing the provisional acknowledgment together with machine-readable information uniquely identifying the transaction and wherein the method further includes a step of the kiosk reading the machine-readable information and providing the stored confirmed acknowledgment that corresponds to the read machine-readable information.

24. The method of claim 23, wherein the stored confirmation acknowledgment providing step includes a step of printing the confirmation acknowledgment.

25. The method of claim 16, wherein the kiosk includes a user interface that enables user interaction with the kiosk and wherein the initiating step includes a step of providing user credentials and selecting goods and/or services for purchase via the user interface.

26. The method of claim 25, wherein the user credentials include at least one of identification and payment instrument information.

27. The method of claim 16, wherein the initiating step includes a step of encapsulating all information required for the remote server to process the transaction into a single data packet and wherein the storing and sending steps store and send the single data packet in the non-volatile memory and to the remote server, respectively.

28. The method of claim 27, wherein the information required for the remote server to process the transaction includes at least one of:
  user credentials including at least one of an identity of the user;
  payment instrument information;
  delivery information, and
  information identifying the subject matter of the transaction.

29. The method of claim 27, flitter including a step of encrypting the single data packet prior to the sending step.

30. The method of claim 16, further comprising a step of receiving a confirmed acknowledgment of the transaction from the remote server and providing the confirmed acknowledgment.

* * * * *

UNITED STATES PATENT AND TRADEMARK OFFICE
CERTIFICATE OF CORRECTION

| | |
|---|---|
| PATENT NO. | : 7,565,353 B2 |
| APPLICATION NO. | : 09/862036 |
| DATED | : July 21, 2009 |
| INVENTOR(S) | : Jean-Marie Gatto, Thierry Brunet de Courssou and Pierre-Jean Beney |

It is certified that error appears in the above-identified patent and that said Letters Patent is hereby corrected as shown below:

Claim 16, line 3, replace

"the remote sewer being coupled to a network, the method" with

"the remote server being coupled to a network, the method".

Signed and Sealed this

Fifteenth Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,565,353 B2
APPLICATION NO. : 09/862036
DATED : July 21, 2009
INVENTOR(S) : Jean-Marie Gatto, Thierry Brunet de Courssou and Pierre-Jean Beney It is certified that error appears in the above-identified patent and that said Letters Patent is hereby corrected as shown below:

Column 16, Claim 16, line 31, replace

"the remote sewer being coupled to a network, the method" with

"the remote server being coupled to a network, the method".

This certificate supersedes the Certificate of Correction issued September 15, 2009.

Signed and Sealed this

Sixth Day of October, 2009

David J. Kappos
*Director of the United States Patent and Trademark Office*